US011859434B1

(12) United States Patent
Collene et al.

(10) Patent No.: US 11,859,434 B1
(45) Date of Patent: Jan. 2, 2024

(54) DAMPENED HINGE FOR A REFRIGERATOR DOOR OR OTHER DOOR

(71) Applicant: Mansfield Engineered Components, Inc., Mansfield, OH (US)

(72) Inventors: James J. Collene, Bucyrus, OH (US); Brian S. White, Galion, OH (US)

(73) Assignee: Mansfield Engineered Components, LLC, Mansfield, OH (US)

( * ) Notice: Subject to any disclaimer, the term of this patent is extended or adjusted under 35 U.S.C. 154(b) by 0 days.

(21) Appl. No.: 15/908,587

(22) Filed: Feb. 28, 2018

Related U.S. Application Data

(60) Provisional application No. 62/507,481, filed on May 17, 2017, provisional application No. 62/465,296, filed on Mar. 1, 2017.

(51) Int. Cl.

| | |
|---|---|
| ***E05F 3/20*** | (2006.01) |
| ***E05F 3/04*** | (2006.01) |
| ***E05D 3/02*** | (2006.01) |
| ***E05F 5/02*** | (2006.01) |
| ***F25D 23/02*** | (2006.01) |
| ***E05F 3/02*** | (2006.01) |

(52) U.S. Cl.
CPC .................. *E05F 3/20* (2013.01); *E05D 3/02* (2013.01); *E05F 3/02* (2013.01); *E05F 3/04* (2013.01); *E05F 5/02* (2013.01); *F25D 23/028* (2013.01); *E05Y 2201/212* (2013.01); *E05Y 2900/31* (2013.01)

(58) Field of Classification Search
CPC ...... E05F 3/20; E05F 3/02; E05F 3/04; E05Y 2201/21; E05Y 2201/264
See application file for complete search history.

(56) References Cited

U.S. PATENT DOCUMENTS

| | | | | |
|---|---|---|---|---|
| 3,543,327 | A | 12/1970 | Nilsson | |
| 4,580,365 | A | 4/1986 | Sieg | |
| 4,686,739 | A | 8/1987 | Fritsche et al. | |
| 4,785,493 | A | 11/1988 | Tillmann et al. | |
| 5,802,670 | A | 9/1998 | Bienik | |
| 5,896,619 | A * | 4/1999 | Koopman | E05F 1/1253 16/286 |
| 6,317,922 | B1 | 11/2001 | Kondratuk | |
| 6,338,536 | B1 * | 1/2002 | Ueno | E05B 17/0033 312/405 |
| 6,393,664 | B1 | 5/2002 | Habegger et al. | |
| 6,442,795 | B1 | 9/2002 | Chen | |
| 6,845,545 | B2 | 1/2005 | Han et al. | |
| 7,921,511 | B2 | 4/2011 | Johnson | |

(Continued)

*Primary Examiner* — Victor D Batson
*Assistant Examiner* — Matthew J Sullivan
(74) *Attorney, Agent, or Firm* — Lippes Mathias LLP

(57) ABSTRACT

A door hinge assembly includes a hinge plate including: (i) an inner portion adapted to be connected to an associated structure; and, (ii) an outer portion adapted for pivoting connection of an associated door thereto. The hinge assembly also includes a damper system with a damper connected to one of: (i) the hinge plate; (ii) the associated door. The damper is adapted to be activated by pivoting movement of the associated door in a closing direction toward a closed position of the associated door such that said damper slows movement of the associated door toward the closed position when the damper is activated.

11 Claims, 20 Drawing Sheets

(56) References Cited

U.S. PATENT DOCUMENTS

| | | | | |
|---|---|---|---|---|
| 7,971,691 | B2 * | 7/2011 | Holzapfel | E05F 5/10 188/321.11 |
| 8,132,876 | B2 * | 3/2012 | An | F25D 23/028 312/405 |
| 8,544,971 | B2 | 10/2013 | Stocker | |
| 8,561,765 | B2 * | 10/2013 | Chen | E05F 5/02 16/50 |
| 8,732,904 | B2 | 5/2014 | Busch | |
| 9,095,214 | B2 | 8/2015 | White et al. | |
| 9,115,525 | B2 * | 8/2015 | Zimmer | E05F 5/006 |
| 9,121,211 | B1 | 9/2015 | White et al. | |
| 9,151,101 | B2 * | 10/2015 | Lowe | E05F 5/08 |
| 9,879,462 | B2 * | 1/2018 | Svara | E05F 5/006 |
| 9,903,639 | B2 * | 2/2018 | Eom | E05D 7/00 |
| 10,697,694 | B2 * | 6/2020 | Steiger | E05D 15/505 |
| 10,782,063 | B2 * | 9/2020 | Lee | F25D 23/025 |
| 2005/0258724 | A1 * | 11/2005 | Hwa Kim | E05F 3/10 312/405 |
| 2008/0127452 | A1 | 6/2008 | Jackson | |
| 2009/0119875 | A1 * | 5/2009 | Migli | E05F 5/006 16/233 |
| 2011/0113816 | A1 | 5/2011 | Stocker | |
| 2012/0233811 | A1 | 9/2012 | Salutzki et al. | |
| 2014/0290002 | A1 * | 10/2014 | Lautenschlager | E05F 5/02 16/84 |
| 2016/0024829 | A1 * | 1/2016 | Lowe | E05F 5/006 16/85 |
| 2016/0230438 | A1 | 8/2016 | Collene et al. | |
| 2017/0122020 | A1 | 5/2017 | Collene | |
| 2017/0130502 | A1 | 5/2017 | Collene | |
| 2020/0217115 | A1 * | 7/2020 | Nuss | E05D 3/06 |
| 2021/0032919 | A1 * | 2/2021 | Peer | E05D 7/123 |

* cited by examiner

DAMPENED HINGE FOR A REFRIGERATOR DOOR OR OTHER DOOR

CROSS-REFERENCE TO RELATED APPLICATIONS

This application claims priority from and benefit of the filing date of U.S. provisional patent application Ser. No. 62/465,296 filed Mar. 1, 2017 and U.S. provisional patent application Ser. No. 62/507,481 filed May 17, 2017, and the entire disclosure of each of these prior provisional applications is hereby expressly incorporated by reference into the present specification.

BACKGROUND

It has become increasingly desirable for refrigerator or other appliance doors and other non-appliance doors to include a damper that provides for a soft close feature that prevents the door(s) from slamming shut while still allowing the door to close completely by way of a spring and/or by force of gravity or inertia without requiring a user to force the door into its closed position. Prior systems have been overly complex, ineffective, cost-prohibitive, aesthetically undesirable, and otherwise have been deemed to be deficient. As such, a need has been identified for a cost-effective, durable, aesthetically pleasing, and easy to install dampened hinge for a refrigerator door, an appliance door, or a non-appliance door that provides for a soft-close feature without undesirably inhibiting the door from closing fully and that otherwise provides superior results and overcomes the deficiencies of known systems.

SUMMARY

According to an embodiment of the present development, a door hinge assembly includes a hinge plate including: (i) an inner portion adapted to be connected to an associated structure; and, (ii) an outer portion adapted for pivoting connection of an associated door thereto. The hinge assembly also includes a damper system with a damper connected to one of: (i) the hinge plate; (ii) the associated door. The damper is adapted to be activated by pivoting movement of the associated door in a closing direction toward a closed position of the associated door such that said damper slows movement of the associated door toward the closed position when the damper is activated.

BRIEF DESCRIPTION OF THE DRAWINGS

FIGS. 5A and 5B are partial side views that both show the door in the partially closed or engaged position of FIG. 3, wherein FIG. 5A shows the refrigerator door in its lowered state and wherein FIG. 5B shows the refrigerator door in its raised state;

FIGS. 12 and 13 show a damper system DSL according to another alternative embodiment of the present development, wherein FIG. 12 shows the damper D of the damper system DSL in the extended condition, and FIG. 13 shows the damper D of the damper system DSL in the retracted condition;

DETAILED DESCRIPTION

Figure 1:
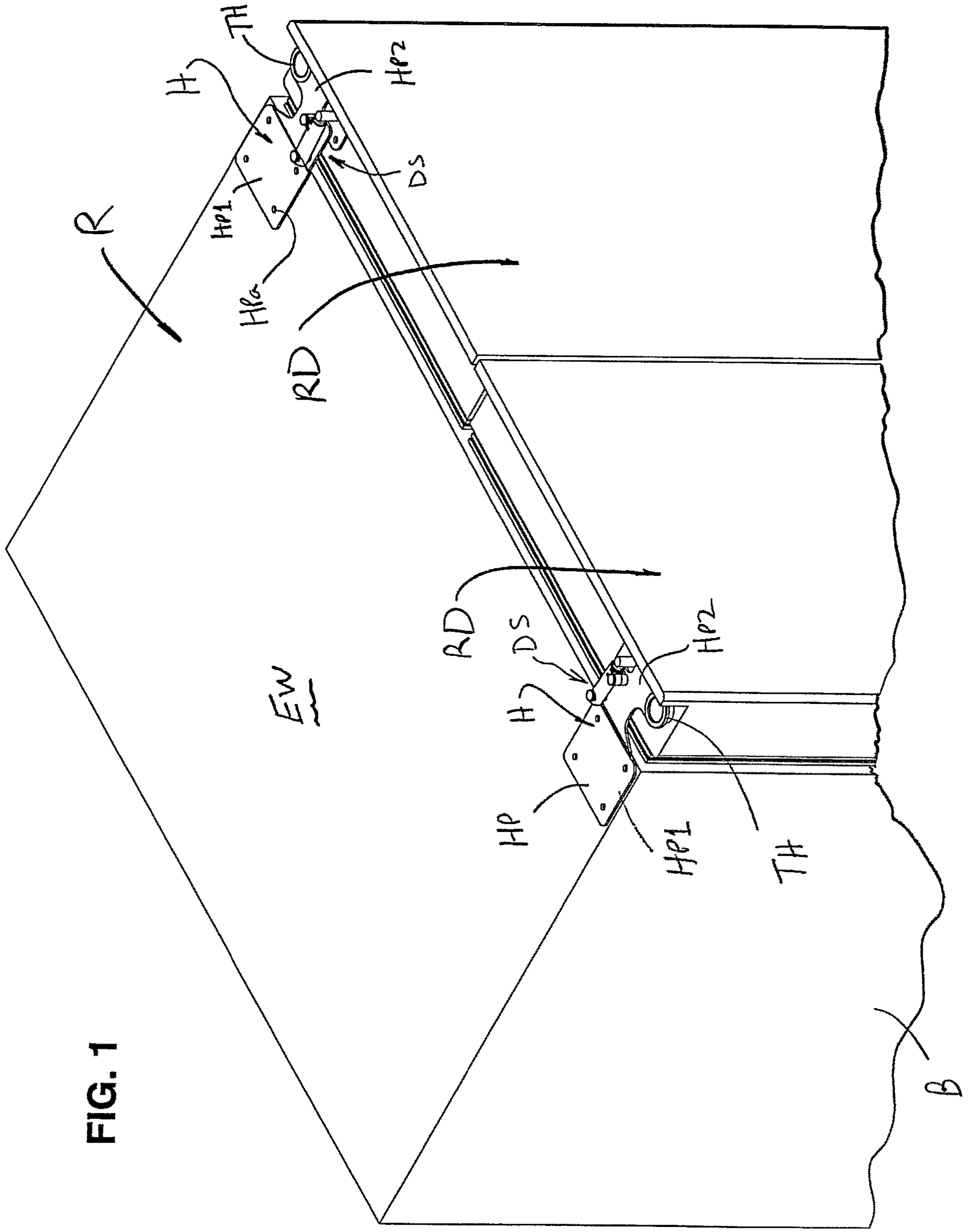
FIG. 1 provides a partial isometric view of a refrigerator including at least one refrigerator door that is pivotally connected to a refrigerator body using a hinge assembly according to a first embodiment of the present development.
Figure 2:
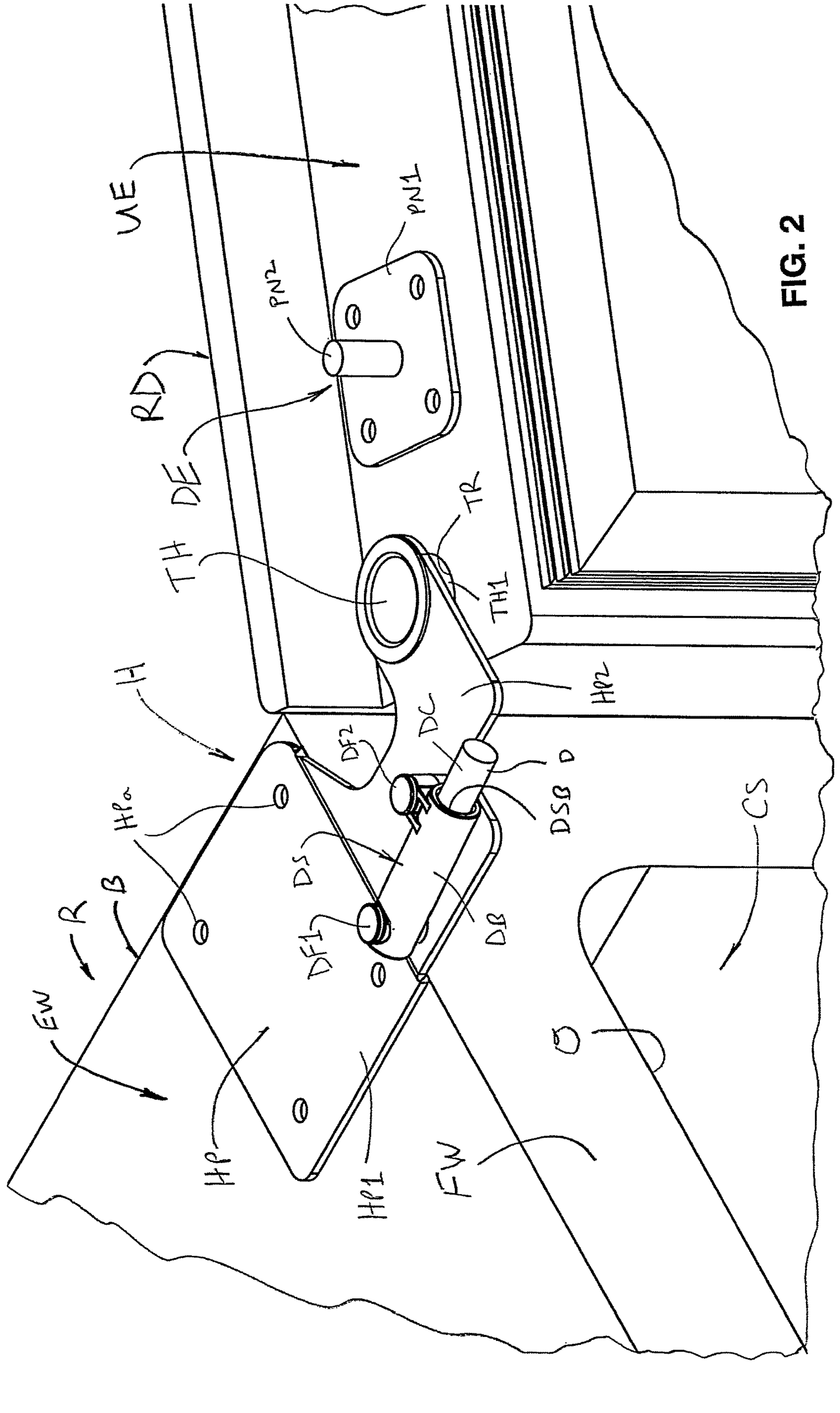
FIG. 2 provides an enlarged isometric view of one of the door hinge assemblies H of the refrigerator of FIG. 1, with the door shown in its opened position.

FIG. 1 provides a partial isometric view of a refrigerator R including at least one refrigerator door RD that is pivotally connected to a refrigerator body B and that pivots about a respective vertical axis between an open and closed position. Two doors RD are shown in FIG. 1. FIG. 1 shows each door RD in its closed position. FIG. 2 provides an enlarged isometric view of one of the door hinge assemblies H of the refrigerator R of FIG. 1, with one of the doors RD in its opened position. In the closed position (FIG. 1), the door(s) RD cover and seal an opening O (FIG. 2) defined in a front wall FW of the body B and that provides access to a refrigerated or cold space CS that contains food and beverages, and when opened, the door(s) RD is (are) pivoted away from the opening O to allow user access to the cold space CS. The illustrated refrigerator R comprises two doors arranged in a French door style, but the refrigerator R can alternatively comprise only one of the doors RD that spans the entire height and width of the opening O.

Typically, each refrigerator door RD is pivotally connected to the refrigerator body B by first (upper or lower) and second (lower or upper) hinge assemblies H, and at least one of the hinge assemblies H is formed in accordance with an embodiment of the present hinge assembly H as disclosed herein. In the present drawings, only a first hinge assembly H is shown in relation to each door RD, and those of ordinary skill in the art will recognize that the second hinge assembly can be identical to the illustrated first hinge assembly H, or the second hinge assembly can be provided in accordance with any other embodiment of the first hinge assembly described herein, or the second hinge assembly can be a conventional hinge assembly. Furthermore, the illustrated first hinge assembly H can function as either an upper hinge assembly located adjacent an upper edge UE of the door RD, or can function as a lower hinge assembly located adjacent a lower edge of the door RD that is located opposite the upper edge UE of the door. The various embodiments of the hinge assembly H provided in accordance with the present development are described herein with reference to a refrigerator door RD and body B, but the hinge assembly H can be used in connection with any other door for an appliance or non-appliance structure or application, and the pivot axis for the refrigerator door RD or other door need not be vertical but can alternatively be horizontal or otherwise oriented.

The hinge assembly H provided in accordance with the present development comprises a hinge plate HP comprising an inner portion HP1 that is flat or otherwise configured to abut an end wall EW of the refrigerator body B or other structure that is oriented perpendicular to the front wall FW, e.g., a bottom wall or the top wall of the refrigerator body B or other structure. As shown herein the hinge plate inner portion HP1 is abutted with an end wall EW that provides the top wall of the refrigerator body B but it could alternatively be abutted with an end wall EW that provides the opposite bottom wall of the refrigerator body B. The hinge plate inner portion HP1 includes apertures HPa adapted to receive rivets, screws, or other fasteners for securing the hinge plate inner portion to the end wall EW of the refrigerator body B or other structure at a location adjacent the intersection of the end wall EW with the front wall FW.

The hinge plate HP further comprises an outer portion HP2 that is connected to the inner portion HP1 and that projects outwardly away from the inner portion HP1 so as to project outwardly from and be cantilevered relative to the front wall FW. The hinge plate HP preferably comprises a one-piece metal plate structure such as a one-piece stamped metal body, but the hinge plate can alternatively be provided by a one-piece or multi-piece metallic and/or non-metallic structure.

The door RD is pivotally connected to the outer portion HP2 of the hinge plate HP. As shown herein, a door pivot stud or "thimble" TH is connected to the hinge plate outer portion HP2. The thimble TH includes a conical or cylindrical body portion TH1 (FIG. 2) that extends vertically from an inner side of the hinge plate HP and that is closely and slidably received in a mating thimble receiver TR comprising an opening located in the upper edge UE of the door in order to pivotally connect the door RD to the hinge plate HP and refrigerator body B. As noted above, a second hinge assembly (not shown), which can be the same or different from the first hinge assembly H, pivotally connects a lower edge of the door RD, which is located opposite the door upper edge UE, to the refrigerator body B in a similar manner. As described in more detail below, the door RD is vertically adjustable relative to the hinge plate HP and the mating connection between the cylindrical body portion TH1 of the thimble TH and the thimble receiver TR accommodates such vertical movement of the door RD relative to the hinge plate HP. The thimble TH typically comprise a metal or polymeric structure. Alternatively, the door RD is pivotally connected to the hinge plate HP by a pin, stud, or any other structure connected to the hinge plate and/or connected to the door RD, and it is not intended that the present development be limited to the illustrated thimble TH for pivotally connecting the door RD to the hinge plate HP.

The hinge assembly H comprises a damper system DS including a damper D adapted to be engaged and activated by the door RD or a structure connected to the door RD when the door RD pivots from its opened position (FIG. 2) to its closed position (FIG. 1) to control, slow, and otherwise damp movement of the door RD into its closed position to prevent harsh contact or "slamming" of the door into the front wall FW of the refrigerator body B upon closing. The hinge assembly H preferably comprises a damper engagement structure DE connected to and/or formed as part of the door RD and adapted to engage and activate the damper D upon movement of the door RD from its opened position to its closed position. In the embodiment of FIGS. 1-8, the damper engagement structure DE comprises a base plate PN1 that is connected to the door upper edge UE using rivets or other fasteners and comprises an engagement pin PN2 that projects vertically upward from the base plate PN1. The engagement pin PN2 is preferably completely cylindrical or at least comprises a cylindrical outer surface where it contacts the damper D (i.e., the engagement pin PN2 alternatively comprises a cylindrical arc segment or a partially cylindrical outer surface) to facilitate sliding tangential contact with the damper D during pivoting movement of the door RD toward its closed position, but the engagement pin PN2 can alternatively comprise any other desired cross-sectional shape. Alternatively, the damper engagement structure DE comprises part of the door RD and/or a component connected directly or indirectly to the door RD.

Figure 3:
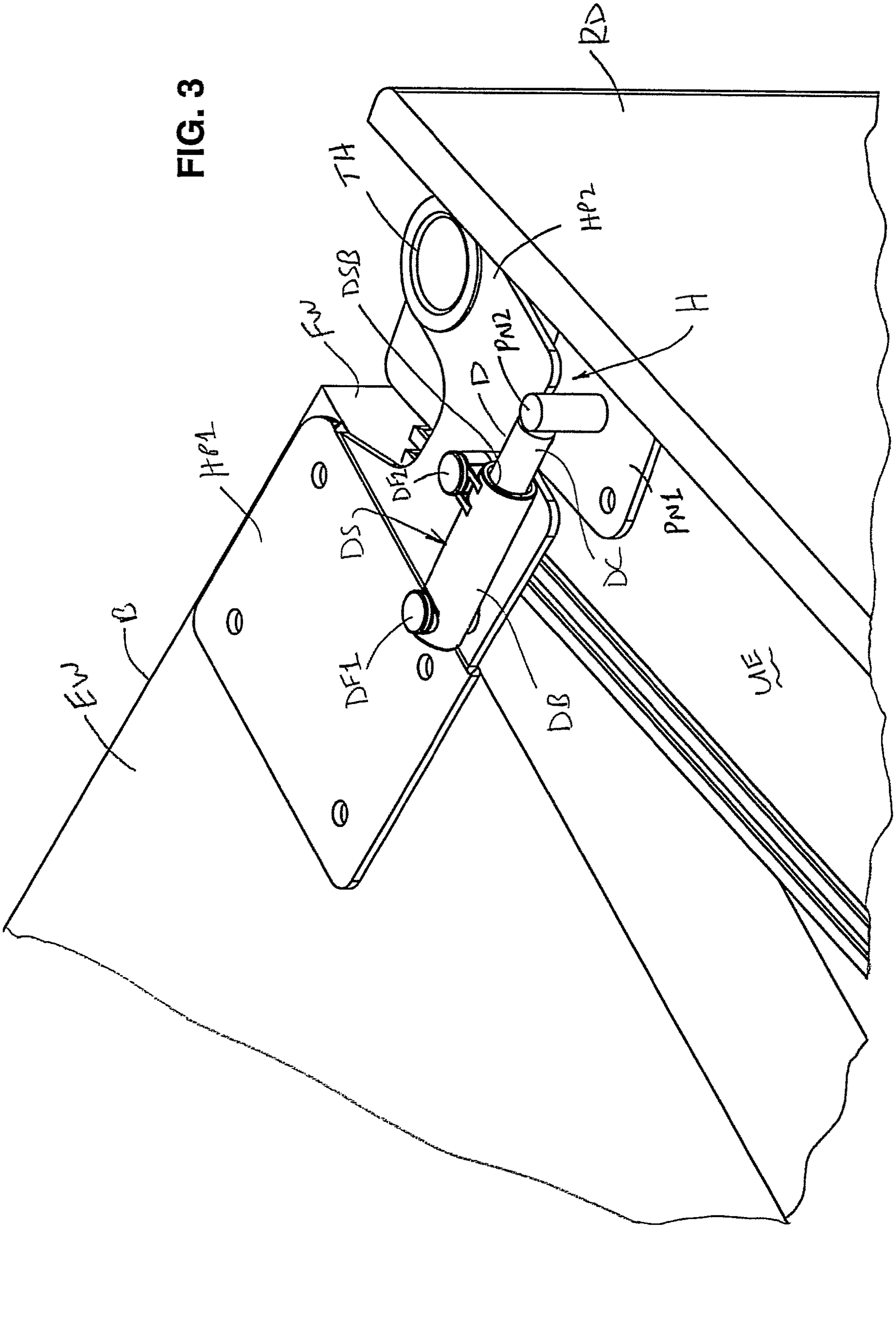
FIGS. 3 and 4 respectively show the door of FIG. 2 in a partially closed position (sometimes referred to as the "engaged" or "engagement" position) and a closed position.
Figure 4:
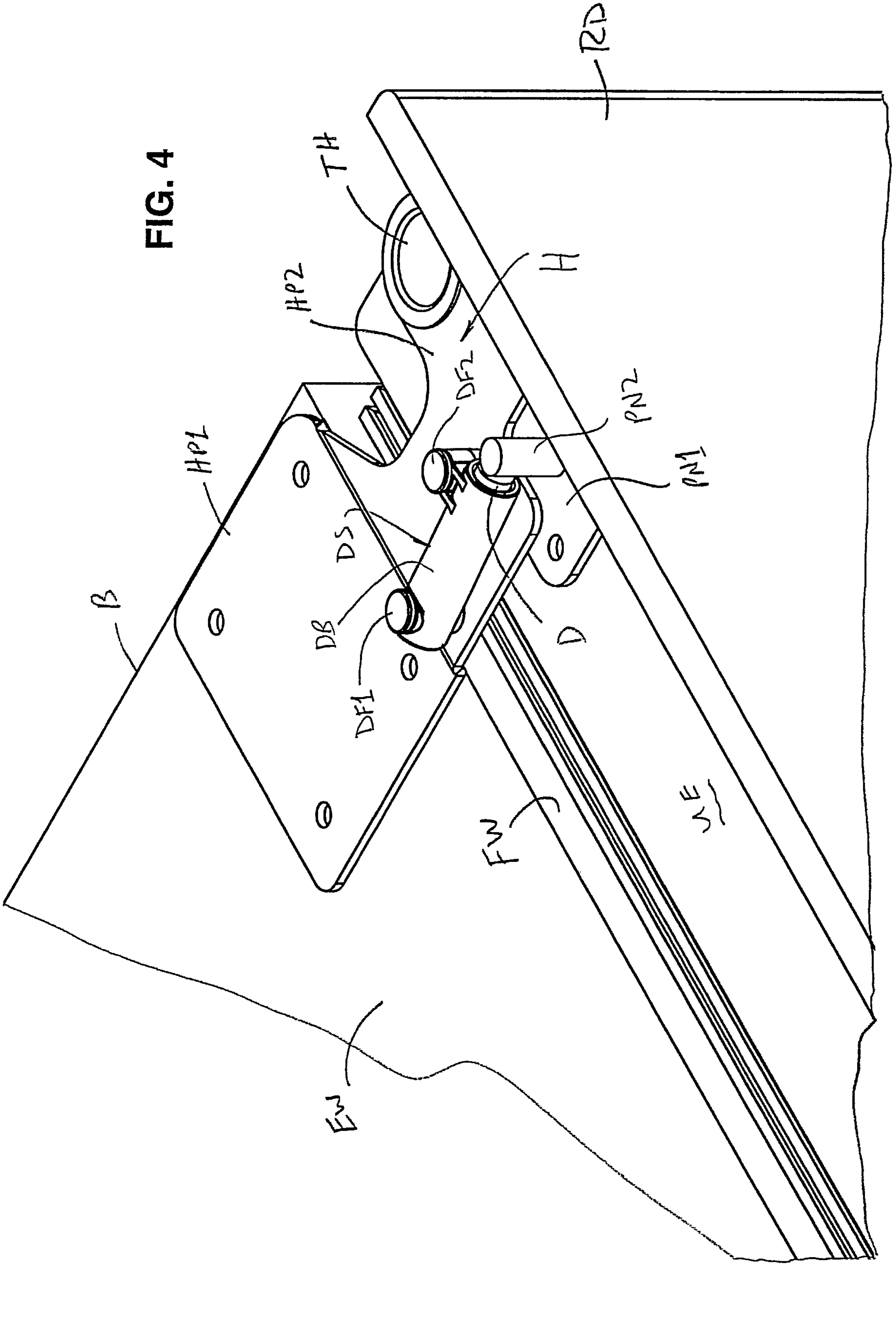

FIGS. 2, 3, and 4 respectively show the door RD in an opened position, a partially closed position (sometimes referred to as the "engaged" or "engagement" position), and the closed position in which the door RD is completely closed. Upon a comparison of these drawings, it can be seen in FIG. 2 that when the door RD is opened, the damper D is free or unconstrained and deactivated so that it assumes a normally extended position. Upon movement of the door RD in the closing direction, the engagement pin PN2 initially contacts the damper D at the engagement position (FIG. 3). Continued closing movement of the door RD from the engagement position results in the engagement pin PN2 moving the damper D to a retracted position (FIG. 4) against a damping force or resistance provided by the damper D such that the damper D is activated and slows movement of the door RD and damps or cushions movement of the door RD into the closed position to prevent slamming of the door RD against the refrigerator body B. The damper D is continuously biased toward its extended position such that when the refrigerator door RD is again opened and the engagement pin PN2 is separated from the damper D, the damper D assumes its extended position/extended configuration in preparation for another damping cycle when the door RD is again closed.

Figure 5A:
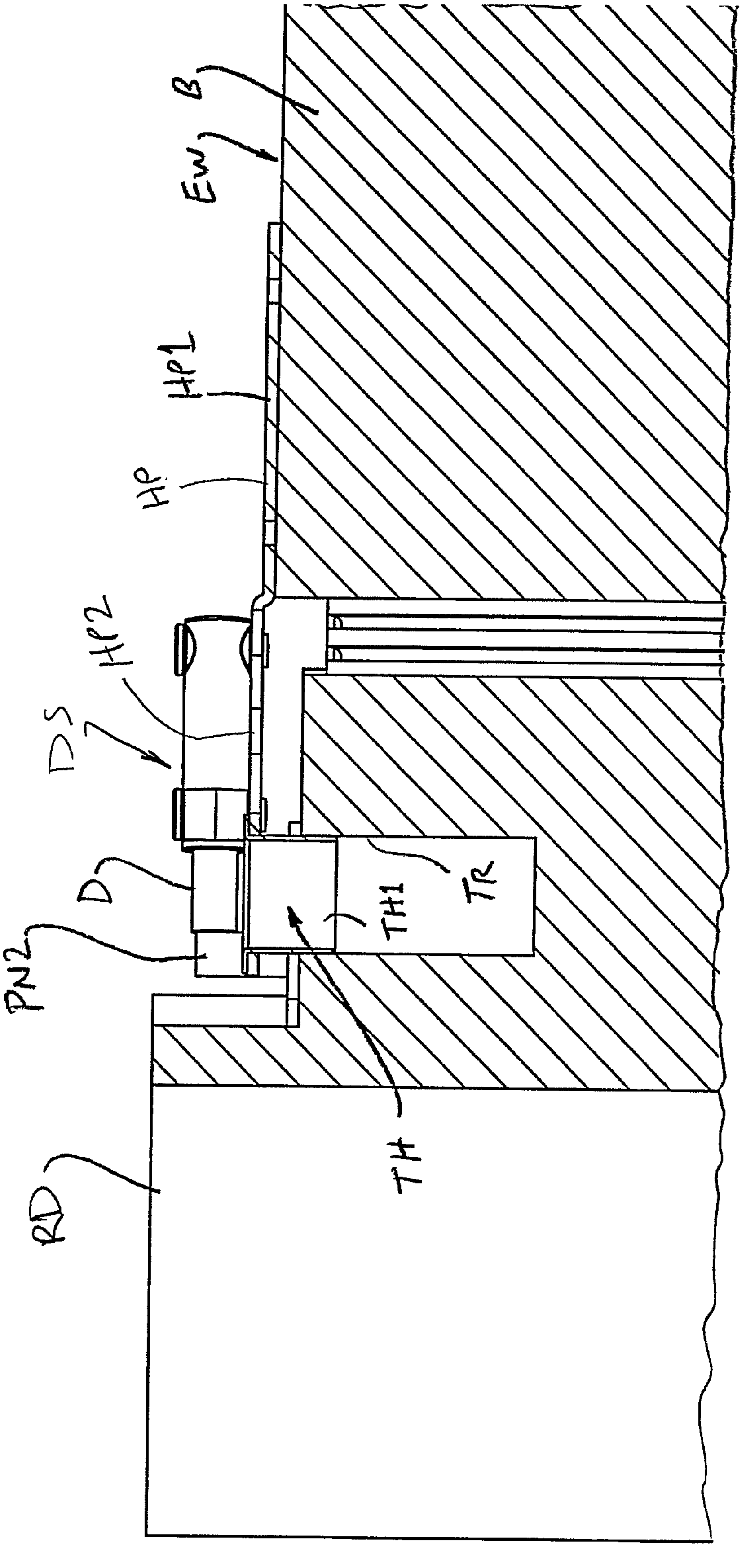
Figure 5B:
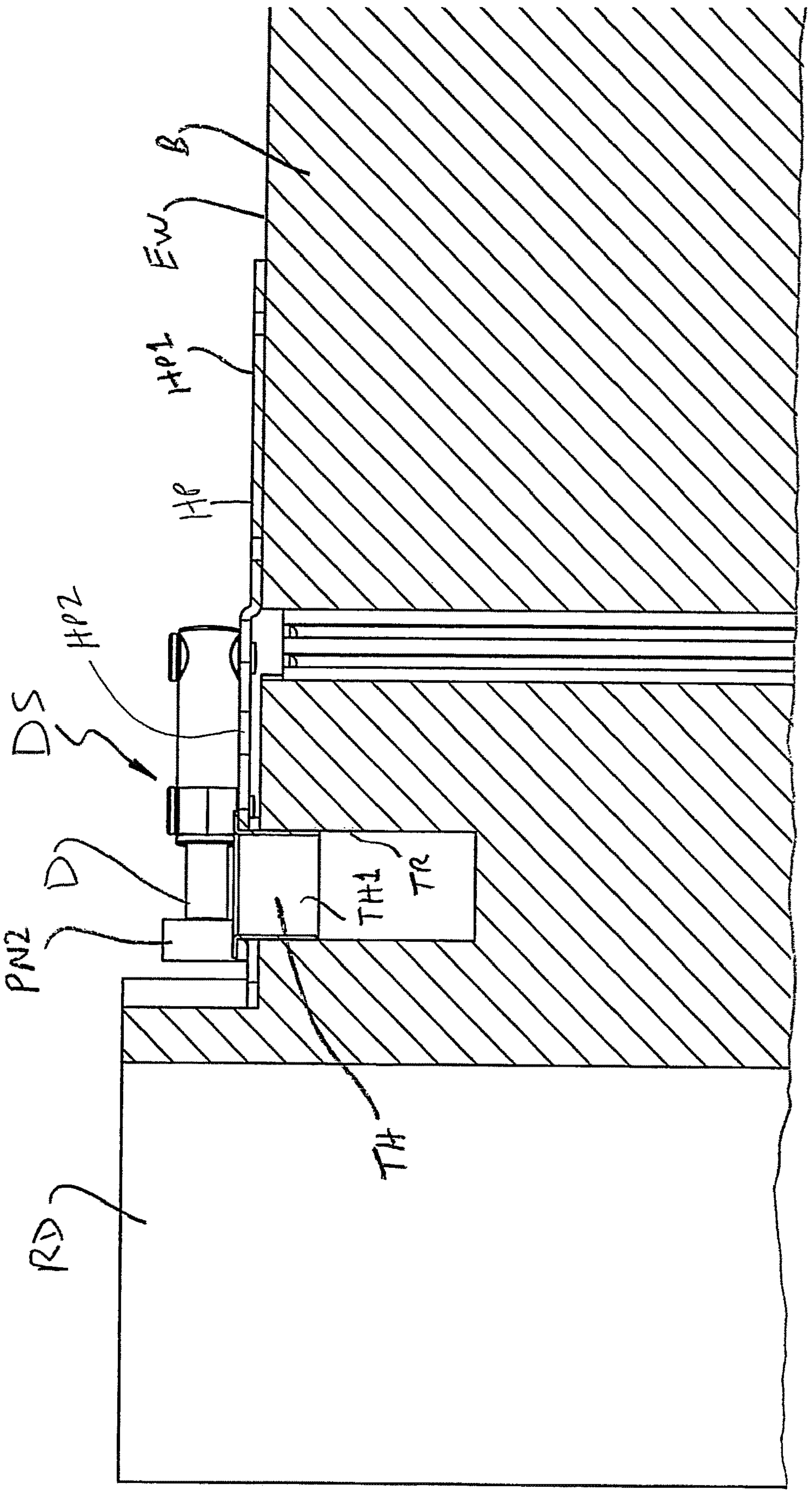

FIGS. 5A and 5B are partial side views that both show the door RD in the partially closed or engaged position of FIG. 3. FIG. 5A shows the refrigerator door RD in its lowered state in which the door RD is configured to be vertically lowered relative to the body B and hinge plate second portion HP2, and FIG. 5B shows the refrigerator door RD in its raised state in which the door RD is configured to be vertically raised relative to the body B and hinge plate second portion HP2 as compared to the lowered position of FIG. 5A. It can be seen that the vertically extending engagement pin PN2 of the damper engagement structure beneficially ensures that the engagement pin PN2 contacts the damper D when the door RD is in either its lowered position (FIG. 5A) or its raised position (FIG. 5B) or any position between the lowered and raised positions. The engagement pin PN2 has a sufficient vertical height above the door upper edge UE that the damper D remains in vertical alignment with a portion of the engagement pin PN2 for all vertical height adjustments of the door RD.

Referring again to FIGS. 2-4, in the illustrated embodiment, the damper D comprises a damper base DB connected to and/or formed as part of the hinge plate HP and a damper cylinder DC operably connected to and supported by the damper base DB. As shown herein, the damper base DB comprises a molded polymeric body that is connected to the inner portion HP1 of the hinge plate HP using first and second rivets, screws, or other damper fasteners DF1, DF2 that extend respectively through the first and second mounting apertures or openings DB1, DB2 in the damper base DB and into the hinge plate HP. The damper base DB comprises a damper support bore DSB, and the damper cylinder DC is operably located in the damper support bore DSB such that the damper cylinder DC is positioned to be engaged and activated by the pin PN2 or other part of the door RD or damper engagement structure DE upon closing of the door.

Figure 6:
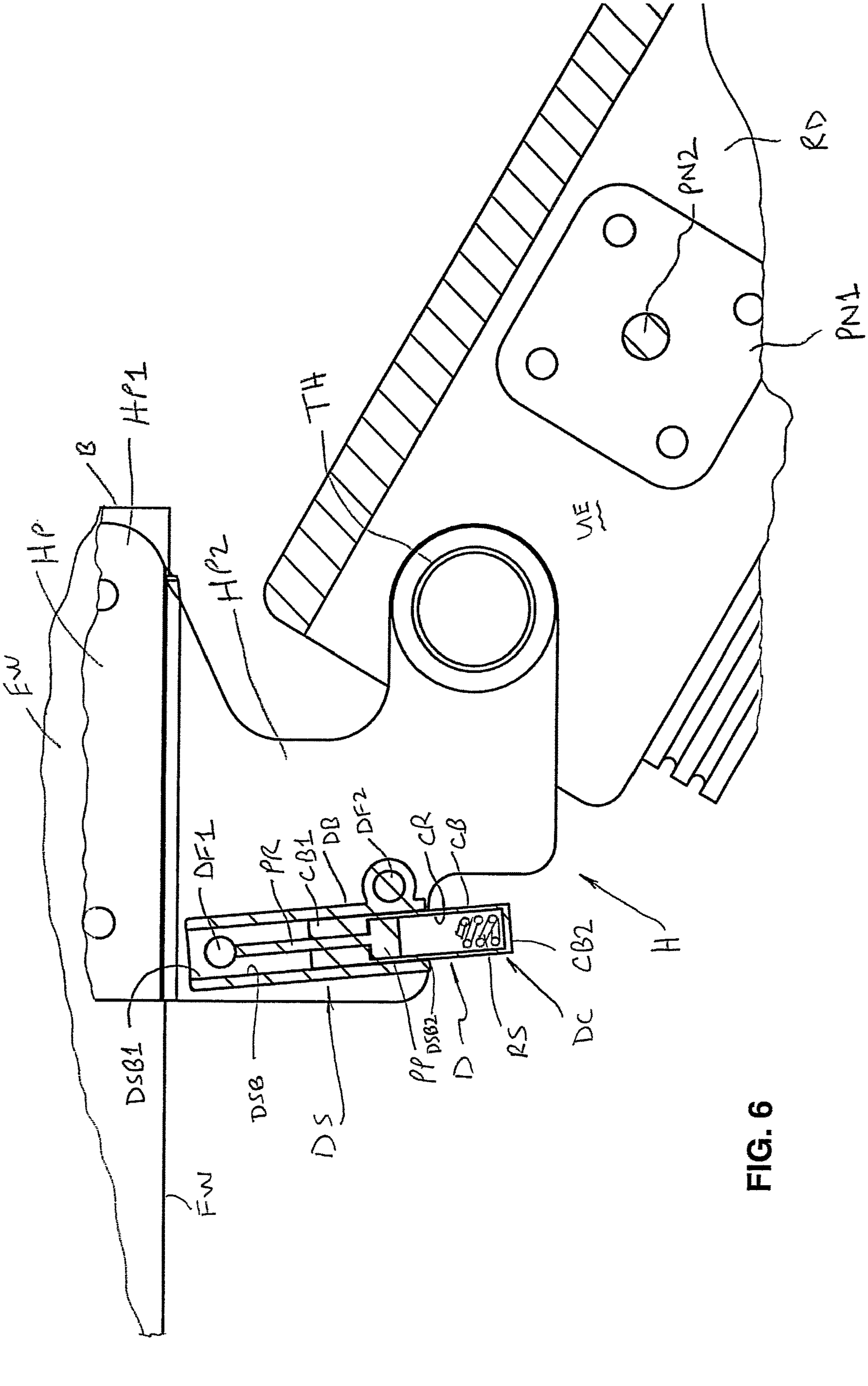
FIGS. 6, 7, and 8 are top views that correspond to FIGS. 2, 3, and 4, and in which the damper and damper base are shown in section to reveal its internal components and operation.
Figure 7:
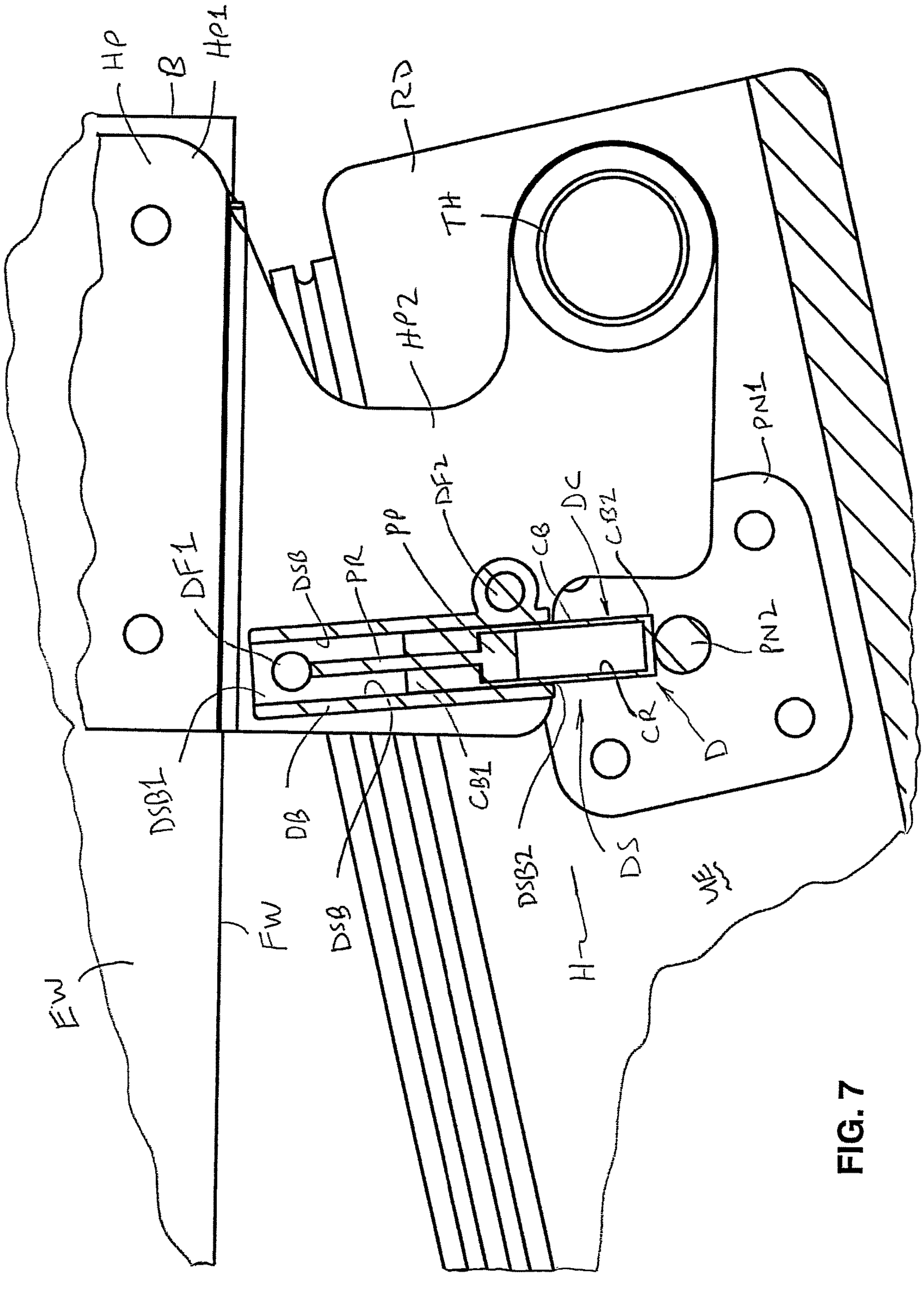
Figure 8:
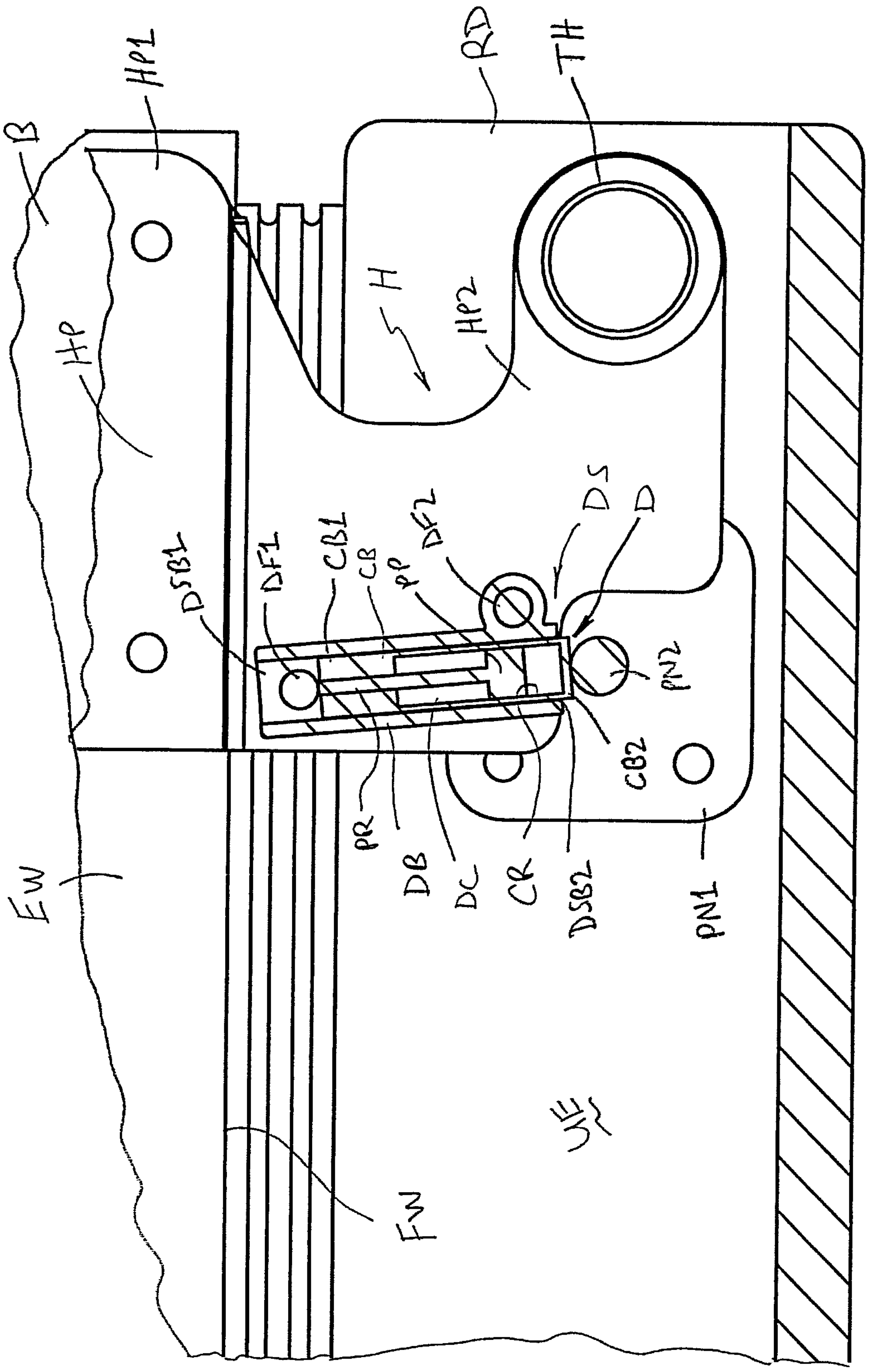

FIGS. 6, 7, and 8 are top views that correspond to FIGS. 2, 3, and 4, and in which the damper D and damper base DB are shown in section to reveal its internal components and operation. The damper cylinder DC comprises a cylinder body CB that includes a cylinder bore CR in which a piston PP is slidably supported for reciprocal sliding movement between an extended position (FIG. 6) and a retracted position (FIG. 8). A piston rod PR includes an inner end connected to the piston PP and includes an opposite outer end spaced from the piston rod inner end. The piston rod PR extends outwardly from the cylinder bore CR at and through a first end CB1 of the cylinder body CB such that the inner end of the piston rod PR is located in the cylinder bore CR and the opposite outer end of the piston rod is located outside the cylinder bore CR and projects outwardly away from the first end CB1 of the cylinder body CB. The cylinder body CB also includes a closed second end CB2 located opposite the first end CB1. When the piston PP and piston rod PR are extended, the piston rod PR projects outwardly from the body first end CB1 a greater extent as compared to when the piston PP and piston rod PR are retracted. When the piston PP and piston rod PR are retracted, the piston PP is moved away from the body first end CB1 and toward the body second end CB2 so that the piston rod PR is correspondingly retracted into the cylinder bore CR and projects outwardly from the body first end CB1 a lesser extent as compared to when the piston PP is in its extended position. The extended and retracted positions of the piston PP correspond respectively to extended and retracted positions or states of the damper D, overall.

In the illustrated example, the cylinder body CB is reciprocally slidable or movable in the damper support bore DSB. The damper fastener DF1 that secures the damper base DB to the hinge plate HP intersects the damper support bore DSB and partially occludes an open inner end DSB1 of the damper support bore DSB. As shown herein, the damper D is arranged with its piston rod PR oriented away from the engagement pin PN2 and toward the damper fastener DF1 and with the second end CB2 of the cylinder body CB projecting outwardly from the open outer end DSB2 (FIG. 6) of the damper support bore DSB. In this arrangement, the outer end of the piston rod PR is abutted with the damper fastener DF1 such that the damper fastener DF1 provides a reaction member or stop against which the damper D is activated. Alternatively, the open inner end DSB1 of the damper support bore DSB can be blocked or occluded by any other structure such as a plug, wall, screw, pin or the like to provide the stop against which the piston rod PR acts. Also, the orientation of the damper D in the damper support bore DSB can optionally be reversed so that the piston rod PR projects outwardly from the open outer end DSB2 of the damper support bore DSB away from the first damper fastener DF1 and the closed second end CB2 of the cylinder body is located in the damper support bore DB and abutted with the damper fastener DF1. In this reverse orientation, the engagement pin PN2 directly engages the outer end of the piston rod PR of the damper D and urges the piston PP from its extended position toward its retracted positon when the door RD is closed to activate the damper D such that it slows and otherwise damps movement of the door RD to into its closed position.

A gas or liquid damping fluid and/or a mechanical damping spring is contained in the damper cylinder bore CR and acts on the piston PP to damp movement of the piston PP from the extended position toward the retracted position in response to inward movement of the cylinder body CB in the damper support bore DSB relative to the piston PP. Preferably, the piston PP is configured such that the damping fluid damps movement of the piston PP to a greater extent when the piston is moving from its extended position toward its retracted position (during inward movement of the cylinder body CB in the damper support bore DSB) as compared to the opposite direction of movement of the piston PP (during outward movement of the cylinder body CB in the damper support bore DSB) in order to facilitate a faster return or "reset" of the piston PP from its retracted position to its extended position when the refrigerator door RD is opened. The illustrated damper P includes a mechanical return spring such as a coil spring RS within the bore CR (shown partially only in FIG. 6) to return the piston PP from its retracted position to its extended position when the damper D is not under load, i.e., to urge the cylinder body CB outwardly away from the damper fastener DF1. The return spring RS is alternatively externally located relative to the cylinder bore CR and coaxially positioned about the piston rod PR between the first end CB1 of the cylinder body and a cap or spring stop connected to or formed as part of the outer end of the piston rod PR to bias the piston PP to its extended position relative to the cylinder body CB.

Figure 9:
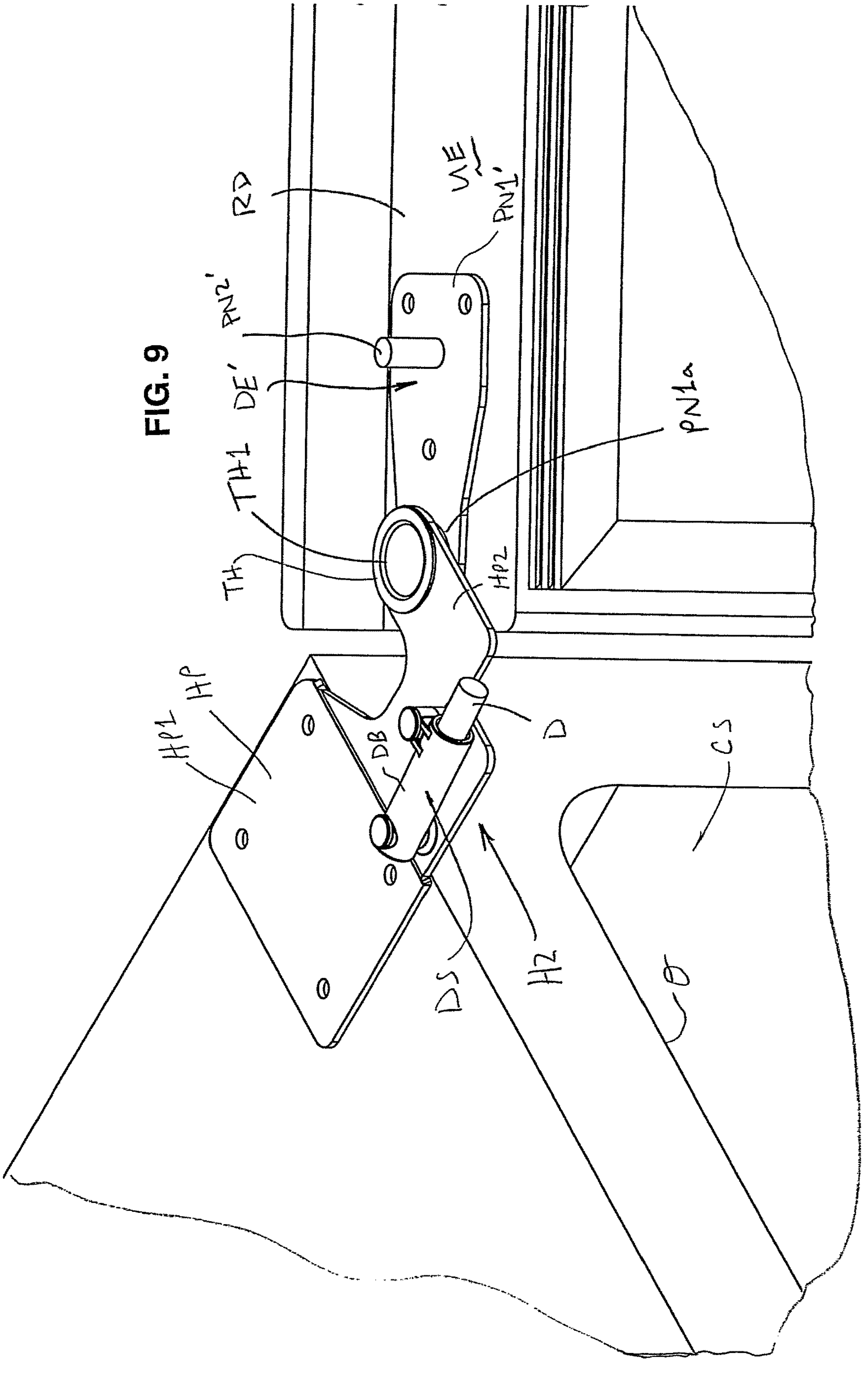
FIG. 9 shows an alternative hinge assembly H2.

FIG. 9 shows an alternative hinge assembly H2 that is identical to the hinge assembly H except as otherwise shown and/or described herein. As such, like reference characters are used to identify like components, without repeating the structure and operation described above. Unlike the hinge assembly H of FIGS. 1-8 in which the damper engagement pin PN2 is separate from the hinge assembly, the hinge assembly H2 comprises an integrated damper engagement structure DE' comprising a base plate PN1' and an engagement pin PN2' projecting upwardly from the base plate PN1'. When the door RD pivots about a vertical pivot axis, the engagement pin PN2' projects vertically outward/upward from the base plate PN1'. The base plate PN1' is pivotally connected to the outer portion HP2 of the hinge plate HP and comprises an aperture PN1*a* through which the thimble body portion TH1 extends such that the base plate PN1' is rotatable about the thimble TH. The base plate PN1 is affixed to the door upper edge UE and the base plate PN1' rotates or pivots about the thimble TH relative to the hinge plate when the door RD is opened and closed. The engagement pin PN2' operates as described above for the engagement pin PN2 to engage and activate the damper D upon closing of the door RD to damp and cushion movement of the door into its closed position.

Figure 10:
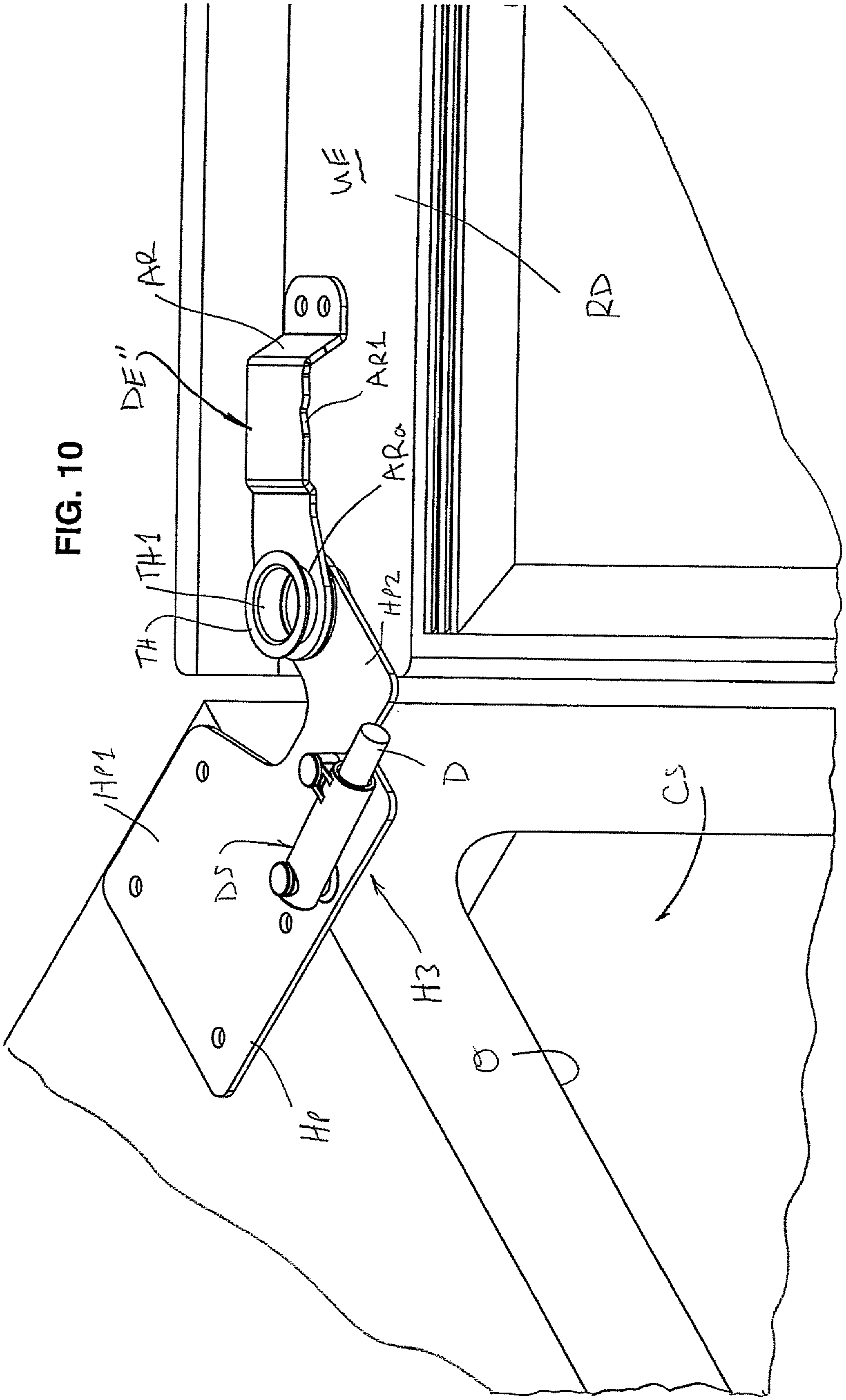
FIG. 10 shows another alternative hinge assembly H3.

FIG. 10 shows another alternative hinge assembly H3 that is identical to the hinge assembly H except as otherwise shown and/or described herein. As such, like reference characters are used to identify like components, without repeating the structure and operation described above. In contrast to the hinge assembly H of FIGS. 1-8, or the hinge assembly H2 of FIG. 9, the hinge assembly H3 omits the engagement pin PN2 and replaces it with a damper engagement arm AR that provides the damper engagement structure DE". The damper engagement arm AR comprises a metal or polymeric plate structure that is pivotally connected to the outer portion HP2 of the hinge plate HP and that includes an aperture ARa through which the thimble TH body portion TH1 extends to rotatably connect the damper engagement arm AR to the hinge plate HP. The damper engagement arm AR is also secured to the door, such as to the upper edge UE thereof, and moves with the door RD pivotally about the thimble TH when the door moves between its opened and closed positions. The profile of the arm AR is such that it includes an inner edge AR1 oriented toward the damper D when the door RD is closed, and the inner edge AR1 of the arm is vertically located and conformed to be aligned with the damper D so that the inner edge AR1 engages and activates the damper D when the door RD is moved from its opened position to its closed position such that the damper D moves toward its retracted position and slows and otherwise damps movement of the door RD into its closed position.

Figure 11A:
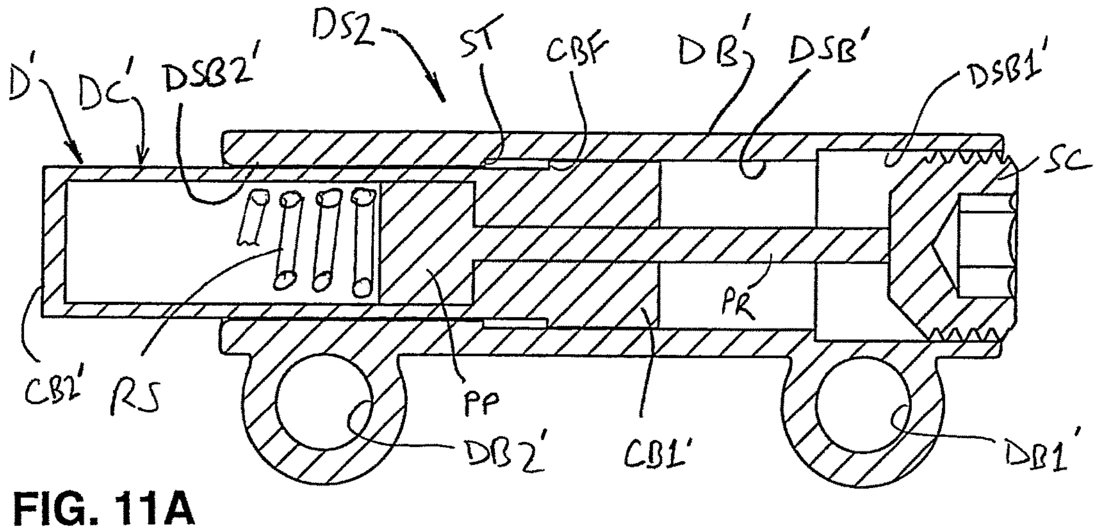
FIGS. 11A, 11B and 11C are section views that show an alternative damper system DS2.
Figure 11B:
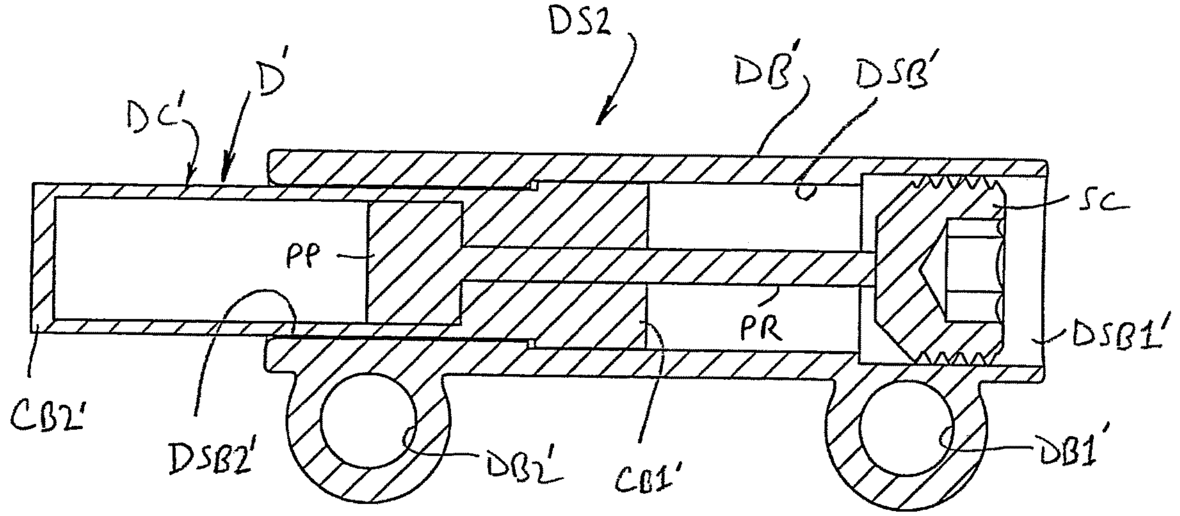
Figure 11C:
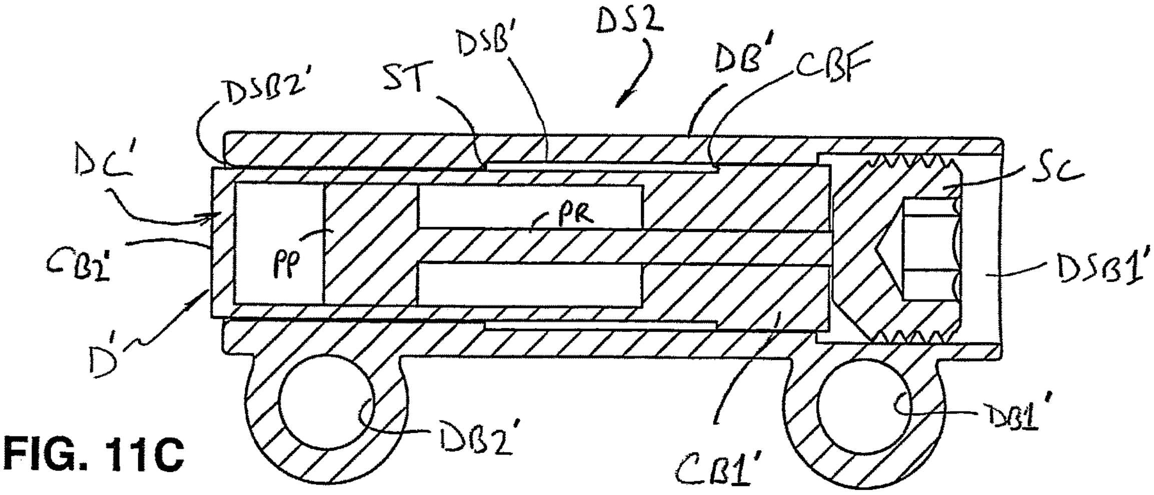

FIGS. 11A, 11B and 11C are section views that show an alternative damper system DS2 that is identical to the damper system DS except as otherwise shown and/or described herein, and like reference characters are used to identify like components without further explanation, while similar components are identified with reference characters including a primed (') designation. As such, the damper system DS2 can be used in place of the damper system DS in the hinge assemblies H, H2, H3 described above.

The damper system DS2 comprises a damper D' that is identical to the damper D except for the shape of the cylinder body CB' as described below. FIG. 11A shows the damper D' in a first extended position, FIG. 11B shows the damper D' is a second extended position, and FIG. 11C shows the damper D' in its retracted position. The damper system DS2 comprises a damper base DB' that is adapted to be connected to and/or is formed as part of the hinge plate HP and that operably supports the damper cylinder DC' of the damper D' in the damper support bore DSB'. As shown in FIGS. 11A-11C, the damper base DB' comprises a molded polymeric body that includes first and second mounting apertures DB1', DB2' that receive respective damper fasteners for securing the damper base DB to the hinge plate HP.

The damper base DB' comprises a damper support bore DSB' that extends through the damper base DB', and the damper cylinder DC' is operably located in the damper support bore DSB' and adapted for reciprocal sliding movement in the damper support bore DSB' as required for the damper D' to provide damping force to counteract and cushion the closing movement of the door RD as described above for the damper system DS. The inner end DSB1' of the damper support bore DSB' is closed by a coaxially located set screw SC that is threaded into the inner end DSB1' of the damper support bore, which includes internal threads for mating with the set screw SC. The cylinder body CB' differs from the cylinder body CB in that it comprises a radially enlarged shoulder or flange CBF located between its opposite first and second ends CB1', CB2'. The damper support bore DSB' comprises a corresponding shoulder or step ST that projects radially inward from its inner wall at a location between its inner and outer ends DSB1', DSB2'. The step ST of the damper support bore DSB' and the shoulder CBF of the cylinder body CB' are dimensioned and arranged relative to each other such that cylinder body CB' is captured in the damper support bore DSB' and is unable to escape the open outer end DSB2', but the cylinder body CB' is still able to slidably reciprocate in the damper support bore DSB' between its extended and retracted positions as required for damping. The cylinder body CB' is installed through the inner end DSB1' of the damper support bore DSB' when the set screw SC is removed. The installation of the set screw SC prevents the cylinder body CB' from being removed from the damper support bore DSB' through the inner end DSB1', and engagement of the cylinder body shoulder CBF with the bore step ST prevents the cylinder body CB' from being completely removed from the damper support bore DSB' through the open outer end DSB2', while still allowing reciprocation of the cylinder body CB' between its extended and retracted positions.

In addition to closing the open inner end DSB1' of the damper support bore DSB', the set screw SC also provides a reaction member or stop against which the outer end of the piston rod PR is abutted. Also, as can be seen by comparing FIGS. 11A and 11B, the axial position of the set screw SC in the damper support bore DSB' can be adjusted by threadably advancing or retracting the set screw SC in the bore DSB' which correspondingly alters the axial location of the damper D' in the damper support bore DSB' and also the distance that the second end CB2' of the damper cylinder body CB' projects outwardly from the damper support bore DSB' when the cylinder body CB' is in its extended position, i.e., the axial position of the set screw SC in the damper support bore DSB' controls the maximum distance by which the cylinder body CB' extends outwardly from the damper support bore DSB' when the damper D' is in its extended position. This adjustment correspondingly controls the angle in which the refrigerator door RD will be positioned relative to the refrigerator body B when the damper D' is first engaged by the engagement pin PN2, engagement arm AR or other damper engagement structure DE of the door during closing of the door RD. It should be noted that the set screw SC as described can be used with the damper base DB and cylinder body CB in the damper system DS of FIGS. 1-10 (without the cylinder body shoulder CBF and bore step ST). Also, the cylinder body CB' including the shoulder CBF and the matching damper base DB' with the bore step ST can be used in the embodiment of the damper system DS of FIGS. 1-10 to capture the cylinder body CB in the damper support bore DSB of the damper base DB.

Figure 12:
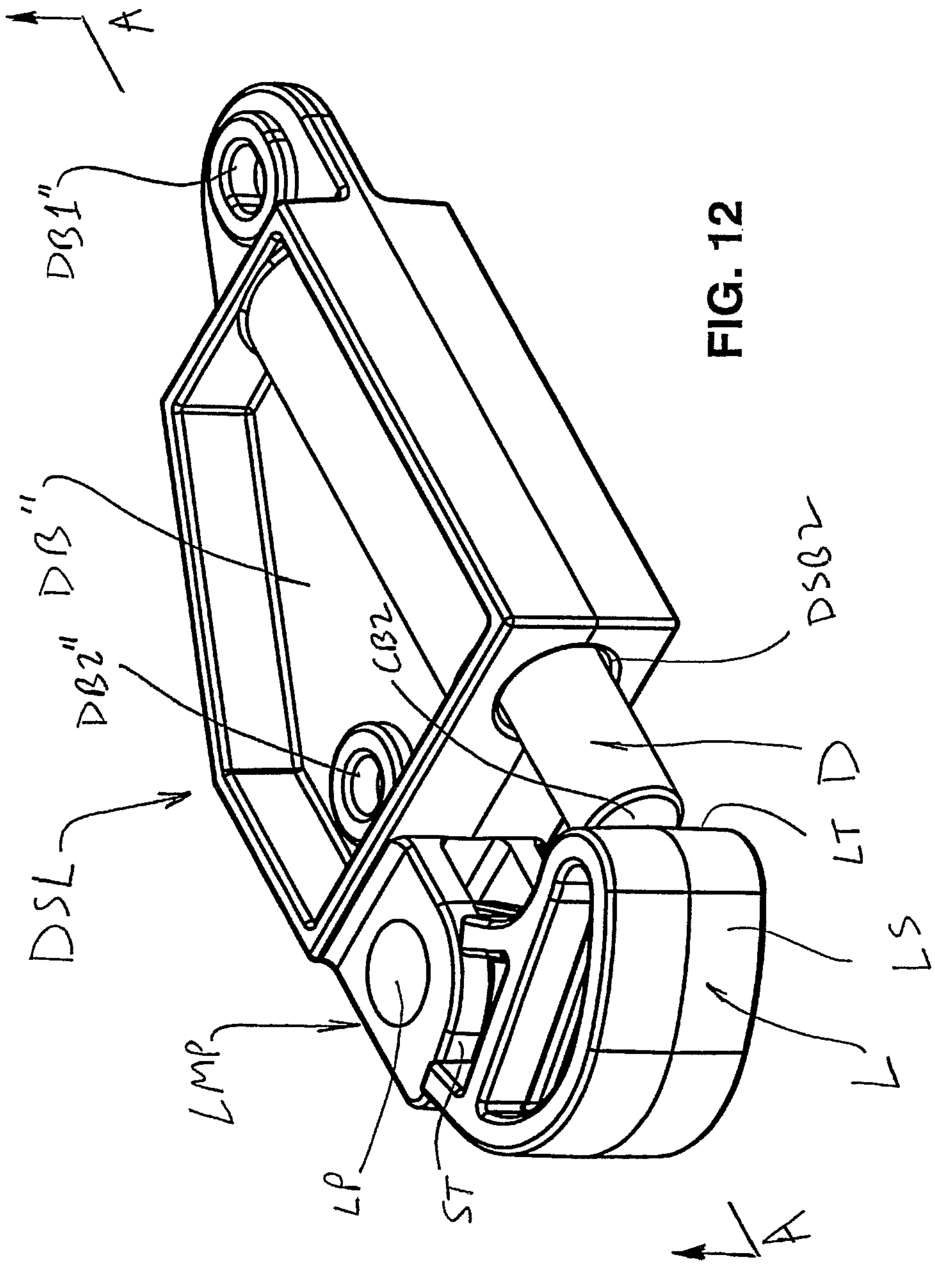
Figure 12A:
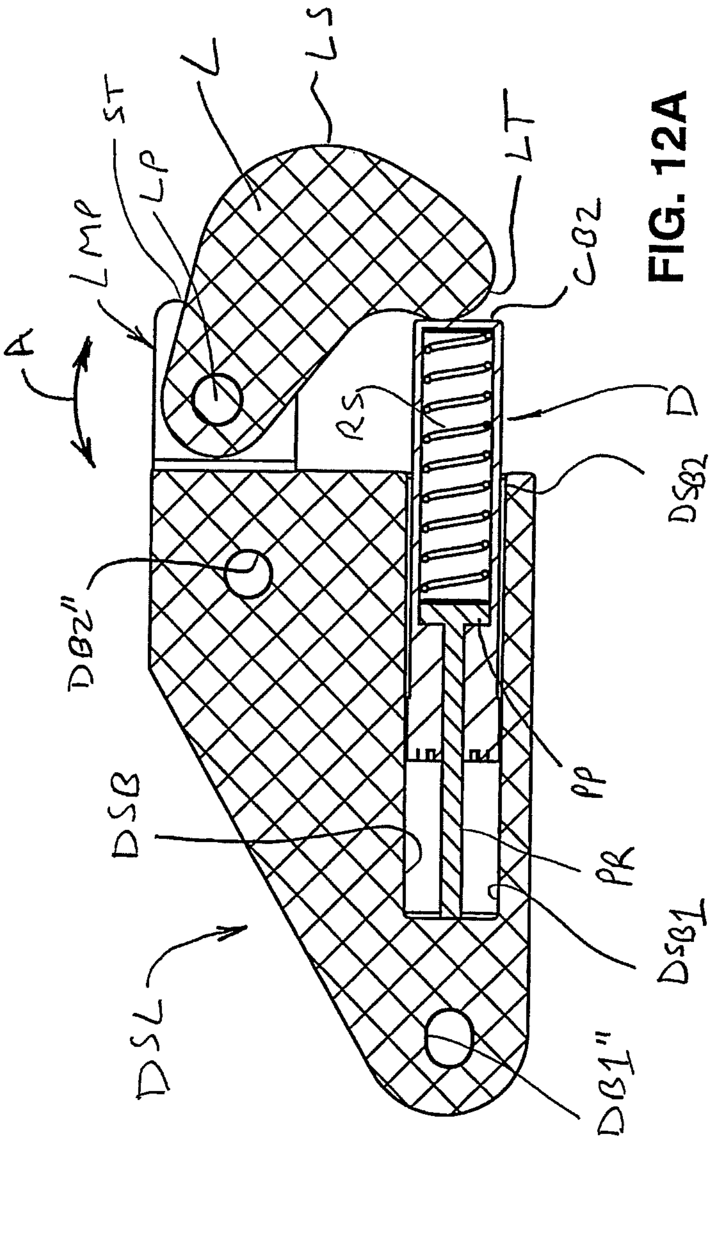
FIGS. 12A and 13A are section views taken at A-A in FIGS. 12 and 13, respectively.
Figure 13:
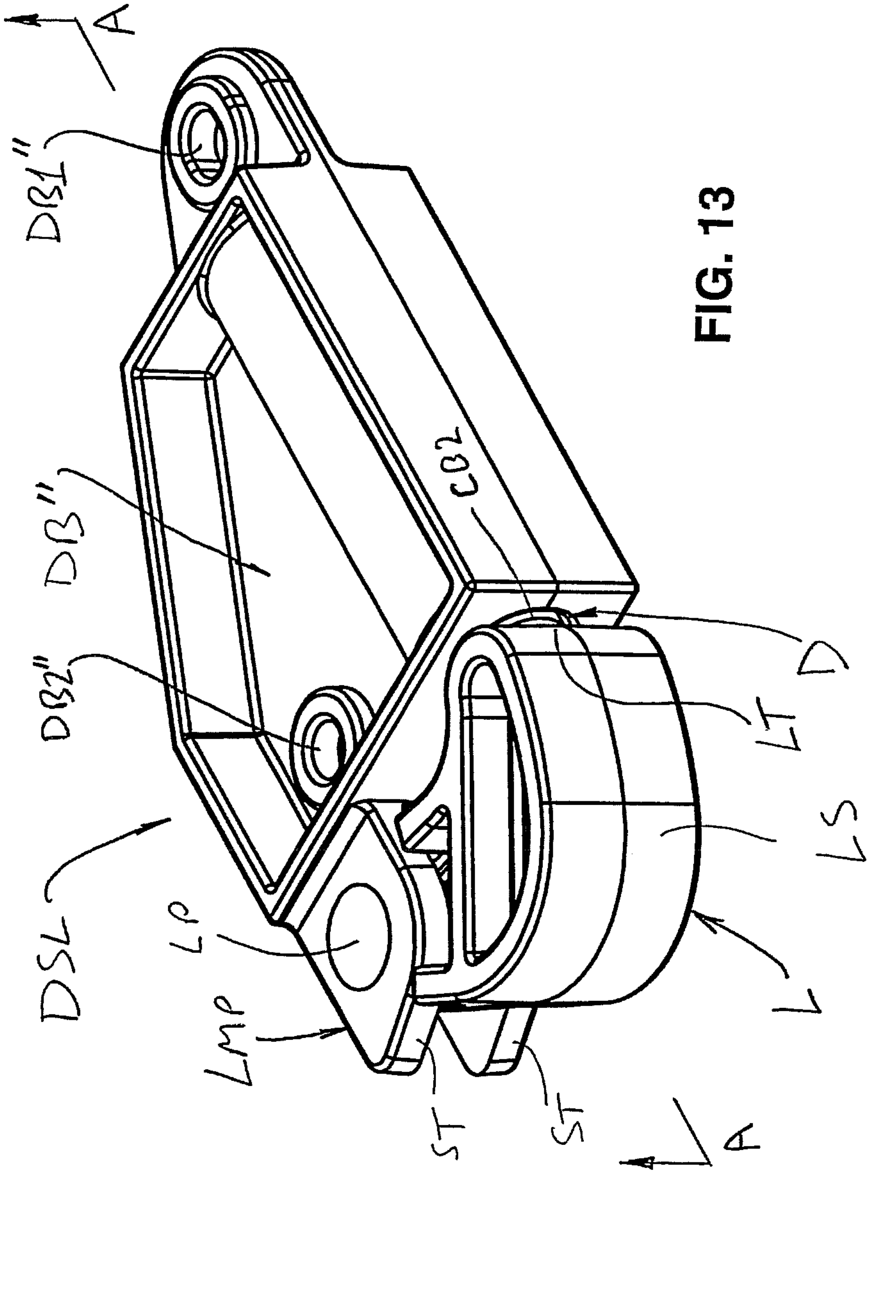
Figure 13A:
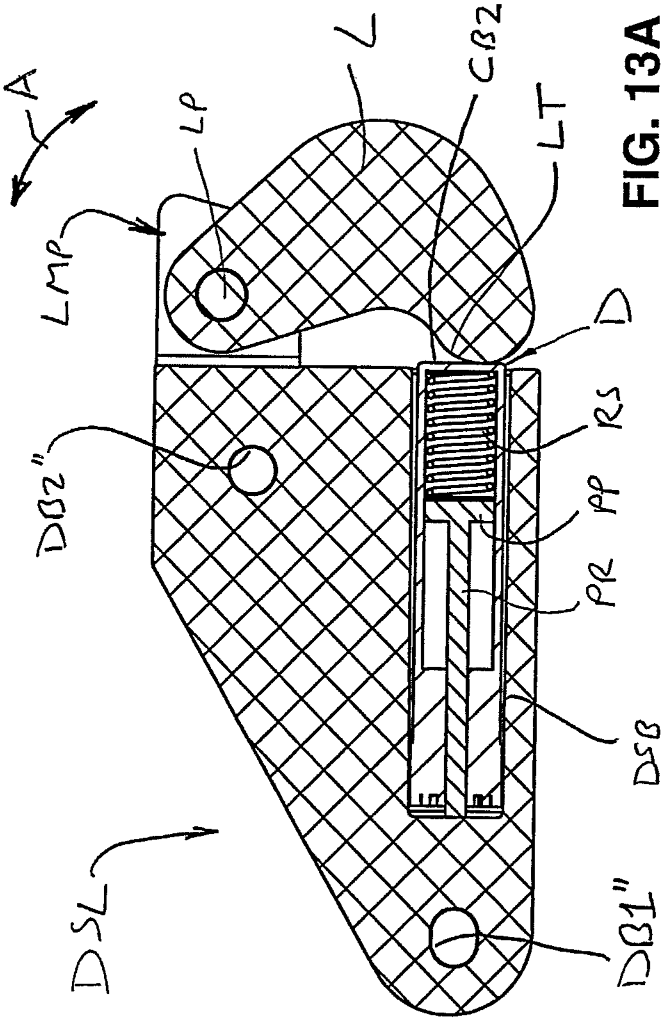

FIGS. 12 and 13 show a damper system DSL that is identical to the damper system DS except as otherwise shown and/or described herein, and like components thereof are correspondingly identified in the drawings using a double-primed (") designation, and further description of such components is not necessarily repeated below. FIG. 12 shows the damper D of the damper system DSL in the extended condition, and FIG. 13 shows the damper D of the damper system DSL in the retracted condition. The damper system DSL can be used in place of the damper system DS as described above or can alternatively be connected to the door RD, in which case the damper engagement structure DE is connected to and/or provided as a part of the appliance body B. FIGS. 12A and 13A are section views of the damper system DSL as taken at A-A of FIGS. 12 and 13, respectively.

Referring to all of FIGS. 12-13A, the damper system DSL comprises a damper base DB" that is the same as the damper base DB except that the damper base DB" is structured to include a lever mounting portion LMP to which a damper activation lever L is movably or pivotally connected at a lever pivot point LP by a rivet, pin, or other pivot fastener. The damper activation lever L pivots on an arc A (FIGS. 12A, 13A) between a first position (FIG. 12) corresponding to the extended position of the damper D, and a second position (FIG. 13) corresponding to the retracted position of the damper D. As shown in the illustrated example, the lever mounting portion LMP comprises a clevis, but a single tab or other structure can alternatively provide the lever mounting portion LMP. The lever mounting portion LMP or the damper base DB" includes at least one stop surface or "stop" ST, and the lever L abuts the stop(s) ST when the lever L is in its first position to prevent pivoting movement of the lever L away from its second position beyond the first position. The mounting apertures DB1", DB2" of the damper base DB" are relocated as compared to the damper base DB to accommodate the lever mounting portion LMP. Otherwise, the damper base DB" is similar to the damper base DB and comprises a damper support bore DSB in which the damper D is operably supported for reciprocal sliding movement between its extended as retracted positions as described above for the damper system DS. Because the lever L abuts the stop(s) ST in its first position, the lever L traps or captures the damper D in the damper support bore DSB.

Unlike the damper system DS, the damper D of the damper system DSL is indirectly acted upon by the damper engagement structure DE through the lever L. More particularly, when connected to the appliance body B, the damper system DSL is adapted to be mounted to the hinge plate HP in place of the damper system DS as shown in FIGS. 1-10, such that the damper activation lever L is oriented outwardly and the engagement pin PN2 or other damper engagement structure DE engages an outer surface LS of the lever L and pivots the lever L from its first position (FIG. 12) toward and into its second position (FIG. 13) on the arc A during movement of the door RD from its opened position toward and into its closed position. During closing movement of the door RD, the lever L is contacted by the damper engagement structure DE and pivoted from its first position toward its second position such that a tip LT or other portion of the lever L contacts the second end CB2 of the damper cylinder body CB and urges the damper cylinder body CB inwardly such that the damper D is activated and moves toward its retracted position and provides a damping force to slow closing movement of the door RD. When the door RD is again opened, the damper return spring RS moves the damper D to its extended position, and the damper D correspondingly exerts a force on the lever L that pivots the lever L on the arc A back toward and into its first position. As with the damper system DS, the damper D of the damper system DSL can be reversed so that the second end CB2 of the cylinder body is oriented toward and located adjacent the innermost end DSB1 of the damper support bore DSB and so that the piston rod PR projects outwardly from the outer end DSB2 of the damper support bore DSB and is located to be engaged and acted upon by the damper activation lever L for movement of the piston PP between its extended and retracted positions.

Figure 14:
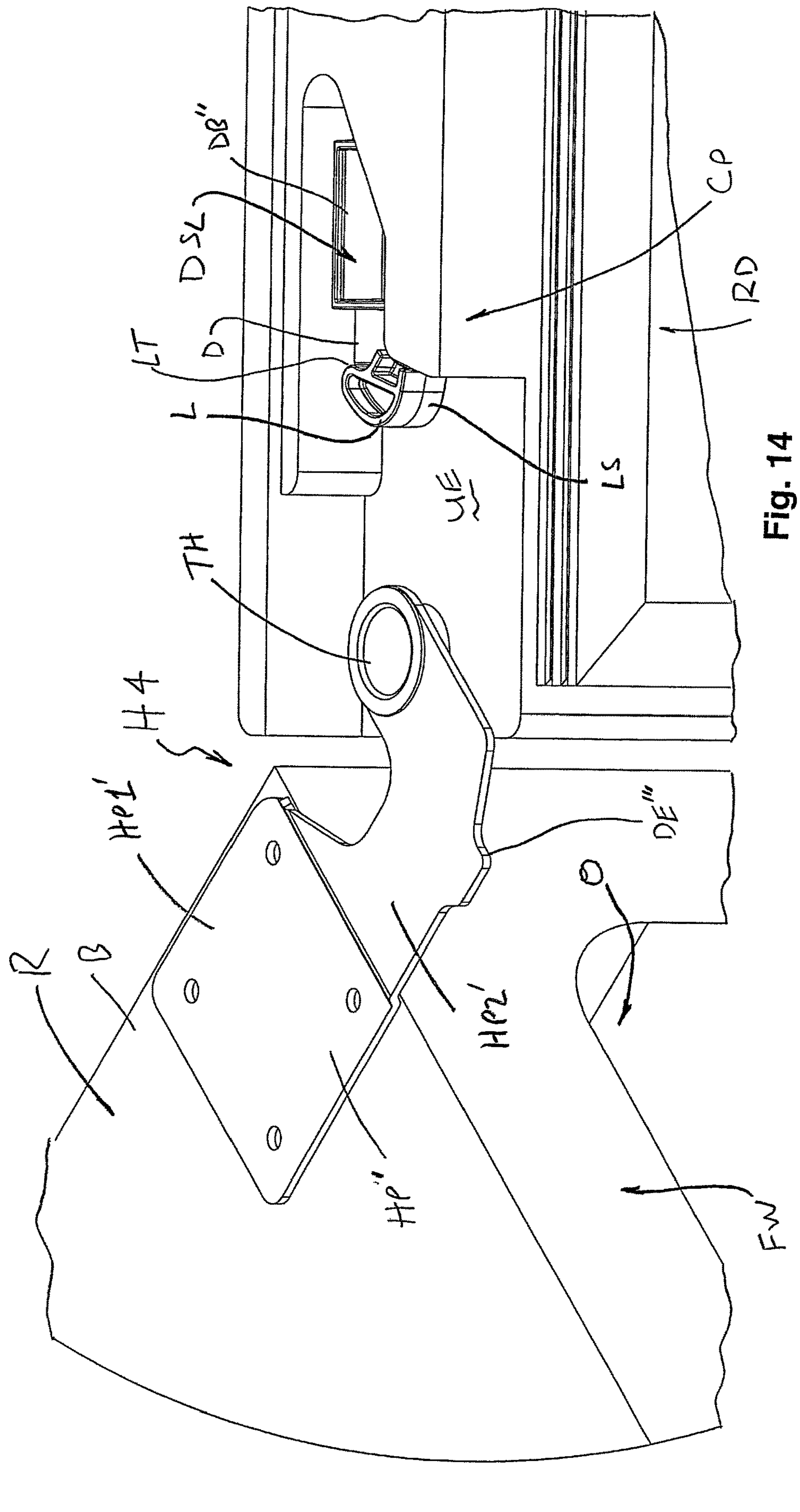
FIGS. 14 and 15 show a hinge assembly H4 according to another alternative embodiment.
Figure 15:
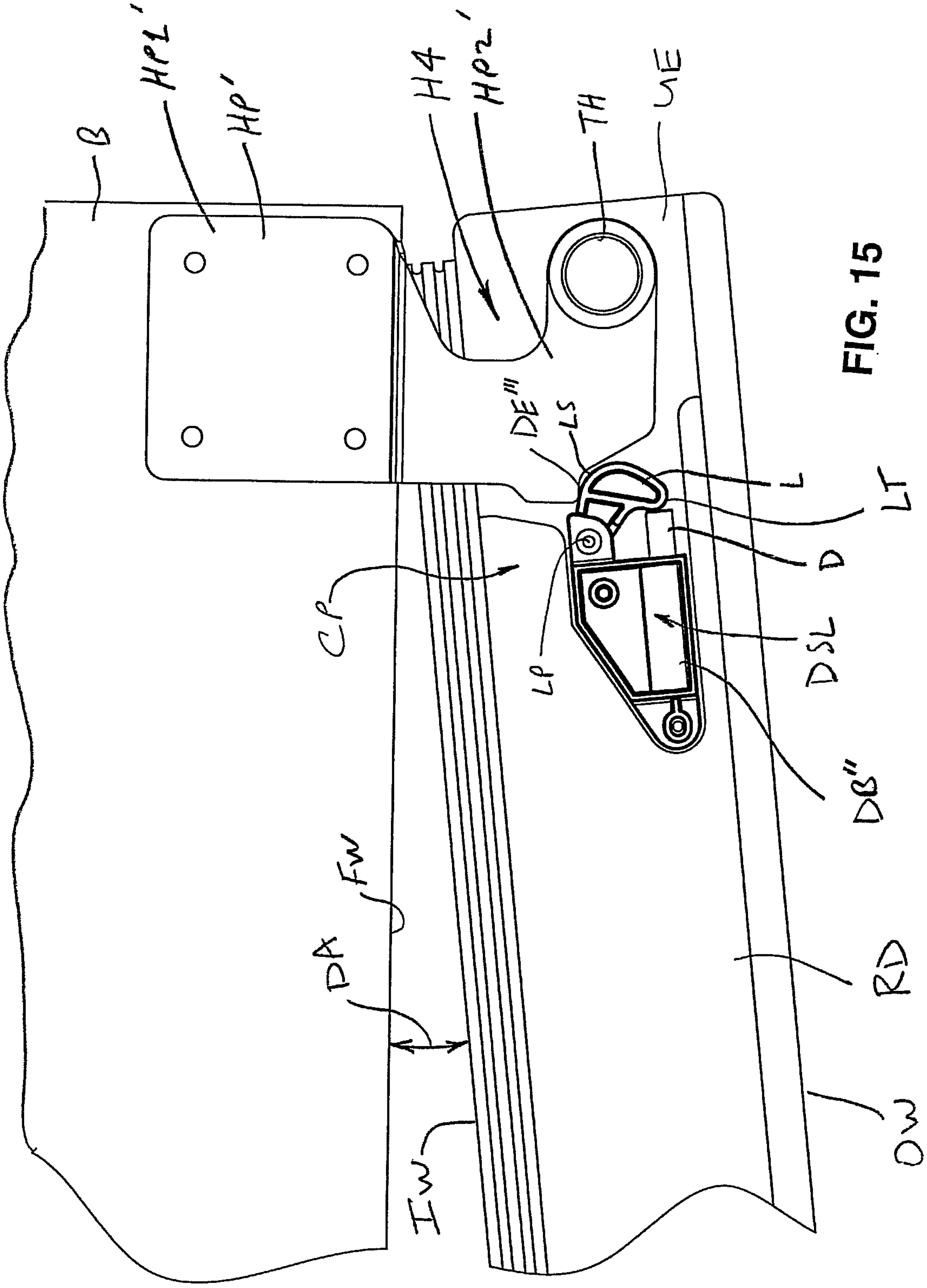

FIGS. 14 and 15 show a hinge assembly H4 that is identical to the hinge assembly H except as otherwise shown and/or described herein, and like components thereof are correspondingly identified in the drawings with a primed (') or similar designation and are not necessarily described further below. The hinge assembly H4 provides an example of a hinge assembly in which the damper system DSL is connected to the door RD instead of the hinge plate HP or the appliance body B. More particularly, the damper base DB" is secured to the upper edge UE or other part of the door RD with the outer surface LS of the lever L oriented toward the door pivot stud/thimble TH and with the tip LT of the lever oriented away from the front wall FW of the body B when the door RD is located in its closed position adjacent the front wall FW. In the illustrated example, the damper system DSL is installed such that the damper D is arranged to lie in-line with the door RD, i.e., parallel to the inner and outer walls IW, OW of the door RD and parallel to the front wall FW of the refrigerator body B when the door RD is closed. Preferably, the tip LT of the lever is oriented toward the outer wall OW of the door RD. This in-line arrangement of the damper system DSL allows most of the damper system DSL to be hidden from a user behind a plastic or similar door cap CP (FIG. 14) for improved aesthetics and to discourage user contact and tampering with the damper system DSL.

To activate the damper system DSL, the appliance body B or another structure connected to or provided as part of the appliance body B comprises a damper engagement portion. As shown herein, a hinge plate HP' is similar to the hinge plate HP described above except that it comprises a damper engagement portion DE", such as an edge or other structure of the outer portion HP2', that is dimensioned and conformed to engage the outer surface LS of the damper system lever L when the door RD is moved from its opened position toward its closed position such that the damper D is activated by the lever L during such movement of the door RD toward its closed position as shown in FIG. 15. In particular, the damper engagement portion DE'" is configured to contact the lever outer surface LS as the door RD moves from its opened position toward its closed position when the door RD reaches a select door angle engagement position relative to the body B as the door RD nears its closed position, e.g., when the door RD is located at a door angle DA in the range of 5 degrees to 20 degrees or any other desired door angle DA as measured between a vertical reference plane the door RD that lies parallel to the inner and outer walls IW, OW and the front wall FW of the body B as shown in FIG. 15. Further movement of the door RD toward its closed position from the engagement position shown in FIG. 15 causes the damper engagement portion DE' to pivot the lever L on the arc A toward its second position to activate the damper D and move the damper toward its retracted position. In this regard, the lever L translates the motion of the door 90 degrees to activate the damper D. When the door RD is pivoted in the opposite direction from its closed position toward its opened position, the lever L is disengaged from the damper engagement portion DE' of the hinge plate HP and the damper return spring RS urges the damper D to its extended position which moves the lever L back to its first position to reset the damper system DSL.

The damper engagement portion DE' is shaped and dimensioned to control or vary the door angle DA at which the damper engagement portion DE'" first contacts the outer surface LS of the lever L during movement of the door RD from its opened position toward its closed position. This allows the closing characteristics of the door RD to be adjusted for a particular application such that the damper D is activated at the desired door angle DA to ensure that the door RD closes with the desired speed and closing force. For example, when used with a French door refrigerator R as shown in FIG. 1, it is often desired to delay activation of the damper D until a vertical articulating mullion located between the two doors RD is partially or fully deployed before activating the damper D during closing of the door, to ensure that the damper D does not interfere with full closing of the door RD.

Likewise, the damper engagement portion DE' is also shaped and dimensioned to control or vary the location on the lever outer surface LS at which the damper engagement portion DE'" contacts the outer surface LS of the lever L during movement of the door RD from its opened position toward its closed position, and this varies the dynamics of the forces acting on the lever L and damper D. In particular, as the contact location of the damper engagement portion DE" on the lever outer surface LS moves outwardly away from the lever pivot point LP toward the lever tip LT, the damping force provided by activation of the damper D is decreased while the effective damping stroke of the damping system DSL is lengthened, i.e., the damper D provides damping force over a wider angle of movement of the door RD as the contact location between the damper engagement portion DE''' and the lever L is moved outwardly away from the lever pivot point LP. In contrast, as the contact location of the damper engagement portion DE' on the lever outer surface LS moves inwardly toward the lever pivot point LP, the damping force provided by activation of the damper D is increased but the effective damping stroke of the damping system DSL is shortened, i.e., the damper D provides damping force over a smaller angle of movement of the door RD as the contact location between the damper engagement portion DE''' and the lever L is moved inwardly toward the lever pivot point LP.

Also, the damper engagement portion DE''' is optionally shaped so that its contact location with the outer surface LS of the lever L changes as the door RD closes so that the damping force provided by the damper D varies as the door closes to provide a dynamic damping effect. In one example, this feature is implemented so that the damper D provides increased damping force as the door approaches its fully closed position, e.g., during the final two—four degrees of closing movement of the door, which allows the damper D to be generally lighter duty to reduce cost while still providing the required damping effect.

In an alternative embodiment, the damper engagement portion DE" is not provided by the hinge plate HP' but is, instead, provided by a hinge cap or cover that is located adjacent the hinge plate or is provided by any other part of the refrigerator body B or a component connected thereto and located adjacent the hinge plate HP.

Figure 16:
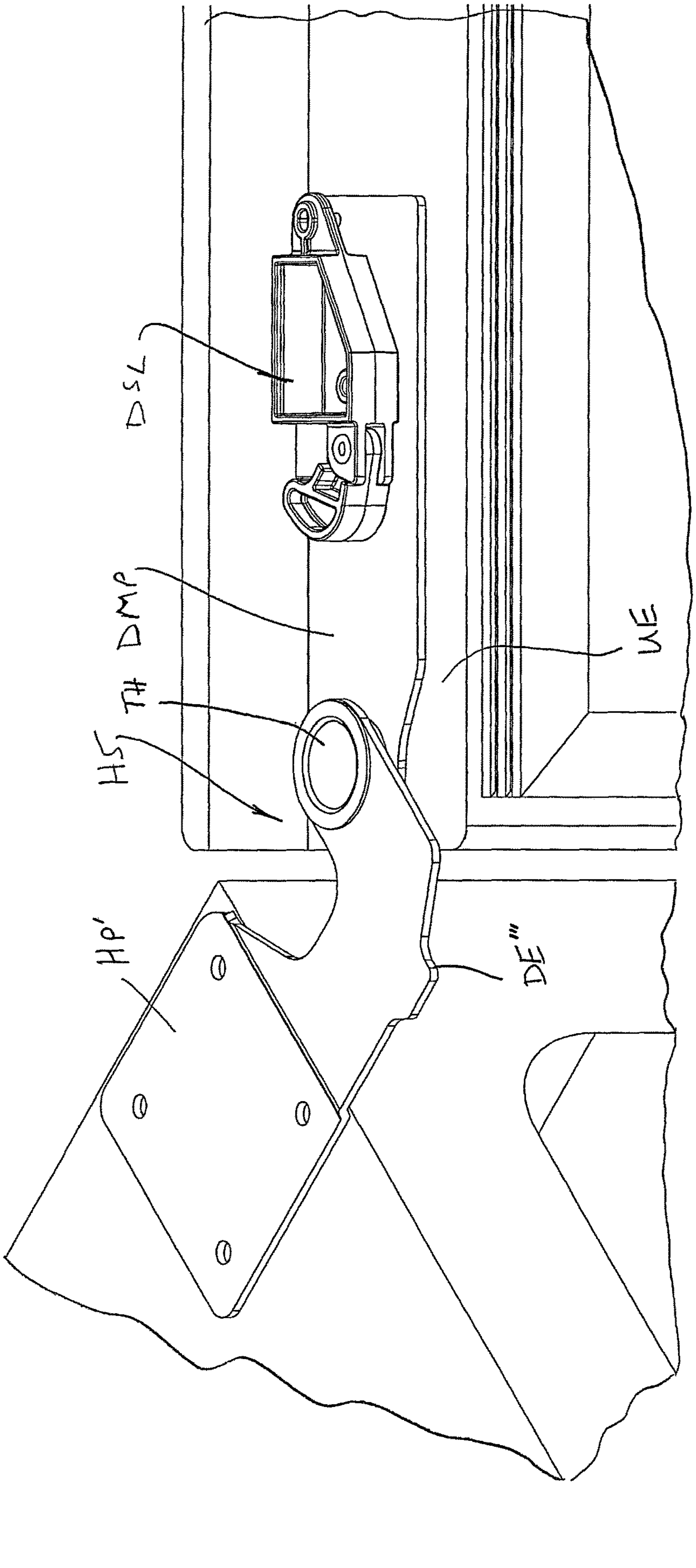
FIG. 16 shows a further alternative hinge assembly H5.

FIG. 16 shows an alternative hinge assembly H5 that is identical to the hinge assembly H4 except as otherwise shown and/or described herein. As such, like reference characters are used to identify like components, without repeating the structure and operation described above. Unlike the hinge assembly H4, the hinge assembly H5 further comprises a damper system mounting plate DMP that is pivotally connected to the hinge plate HP' by way of the door mounting stud/thimble TH so as to be integrated with the hinge plate HP' but rotatable about the door mounting stud/thimble TH. The damper system DSL is secured to the damper system mounting plate DMP, which is, itself, secured to the upper edge UE of the door RD. This arrangement can simplify installation of the hinge assembly H5 onto the body B and door RD.

Figure 17:
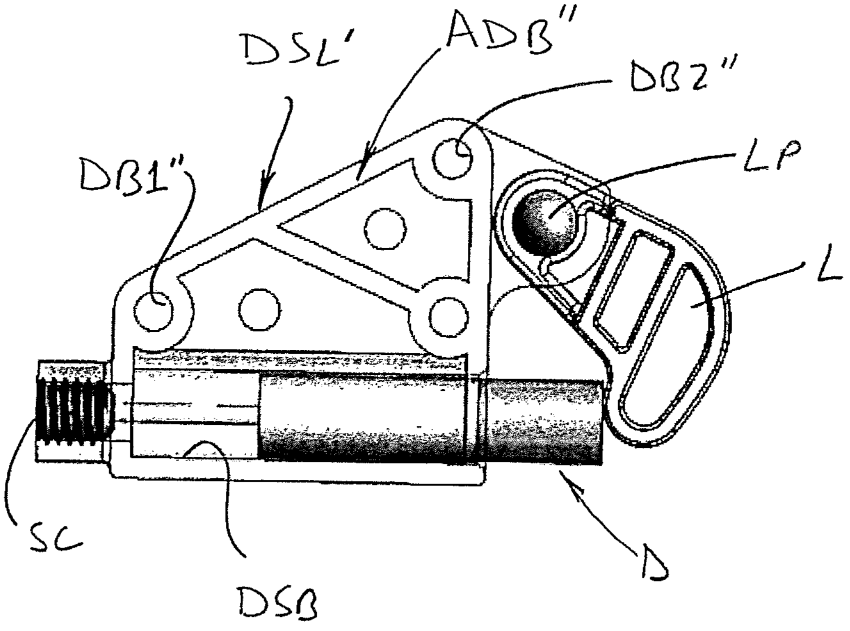
FIG. 17 illustrates an alternative damper system DSL'.

FIG. 17 illustrates an alternative damper system DSL' that is identical to the damper system DSL except as otherwise shown and/or described herein. In particular, the damper system DSL' comprises a modified damper base ADB" that is similar to the damper base DB" except that the damper mounting apertures DB1", DB2" are relocated to so that the base ADB" can be structured to include an adjustable set screw SC as described with reference to FIGS. 11A-11G. In such case, the damper D need not be provided as a damper D' (and the damper support bore need not be correspondingly provided as the damper support bore DSB') as described with reference to FIGS. 11A-11C, because the lever L captures the damper D in the damper support bore DSB as described above. Advancement or retraction of the set screw SC in the damper support bore DSB alters the distance by which the damper D projects outwardly from the damper support bore DSB to provide some adjustability for the door angle DA at which the lever L contacts the damper engagement portion DE''' during movement of the door RD from the opened position to the closed position.

As noted above, the damper system DSL is not limited for use with refrigerator doors RD or other appliance doors. The damper system DSL can alternatively by used to damp the movement of any other door relative to a frame, body, or other structure to which the door is pivotally connected. In such case, the door can be arranged to pivot about a vertical axis, a horizontal axis, or any other pivot axis.

The development has been described with reference to preferred embodiments. Modifications and alterations will occur to those of ordinary skill in the art to which the invention pertains, and it is intended that the claims be construed as broadly as possible to encompass all such modifications and alterations while preserving the validity of the claims.

The invention claimed is:

1. An appliance door hinge assembly comprising:

a hinge plate including: (i) an inner portion adapted to be connected to an associated appliance structure; and, (ii) an outer portion adapted for pivoting connection of an associated door thereto;

a stud that projects outwardly from the outer portion of the hinge plate and adapted to pivotally support the associated door;

a damper system comprising a damper connected to the hinge plate;

a damper engagement structure connected to the associated door;

wherein said damper engagement structure is separated from the damper system when the associated door is in an opened position, said damper engagement structure contacts said damper system when the associated door is pivoted to an engagement position located between said opened position and a closed position, and said damper engagement structure contacts and activates the damper system when the associated door is pivoted toward the closed position from the engagement position such that said damper slows movement of the associated door toward the closed position when the damper is activated;

said hinge assembly further comprising a base plate pivotally connected to the hinge plate by said stud to form an integrated assembly with said hinge plate, said base plate including a base plate aperture located therein, wherein said stud extends through said base plate aperture such that said base plate is pivotally connected to the outer portion of the hinge plate, wherein part of said base plate provides said damper engagement structure, said base plate adapted to be connected to the associated door for pivoting movement with the associated door relative to the hinge plate about said stud;

wherein the associated door and the base plate both pivot about a vertical pivot axis defined by the stud.

2. An appliance door hinge assembly comprising:

a hinge plate including: (i) an inner portion adapted to be connected to an associated appliance structure; and, (ii) an outer portion adapted for pivoting connection of an associated appliance door thereto;

a stud projecting from the outer portion of the hinge plate and adapted to pivotally engage the associated appliance door;

a damper system comprising a damper connected to the hinge plate;

a damper engagement arm pivotally connected to the outer portion of the hinge plate by said stud that projects from the outer portion of the hinge plate to form an integrated assembly including said hinge plate and said damper engagement arm, wherein the stud is pivotally engaged with an aperture defined in the damper engagement arm such that said stud connects the damper engagement arm to the hinge plate, said damper engagement arm adapted to be connected to the associated appliance door such that the associated appliance door and damper engagement arm pivot together about said stud;

said damper system comprising: (i) a base including a damper support bore; and (ii) a damper comprising a cylinder body slidably located in the damper support bore of the base, said damper further comprising a piston slidably supported in a cylinder bore defined in said cylinder body and a piston rod connected to said piston and extending outwardly from a first end of the cylinder body, said piston adapted for movement in said cylinder bore between an extended position corresponding to an extended position of the damper and a retracted position corresponding to a retracted position of the damper;

wherein said damper engagement arm is separated from the damper system when the associated door is in an opened position, said damper engagement arm contacts said damper system when the associated door is pivoted to an engagement position located between said opened position and a closed position, and said damper engagement arm contacts and activates the damper system and causes sliding movement of the cylinder body relative to the base in the damper support bore such that said damper is moved from its extended position to its retracted position when the associated door is pivoted toward the closed position from the engagement position such that said damper slows movement of the associated door toward the closed position when the damper is activated.

3. The door hinge assembly as set forth in claim 2, wherein the damper engagement arm comprises an inner edge oriented toward the damper when the associated door is closed, and wherein the inner edge of the damper engagement arm is located and conformed to be aligned with and engage the damper when the door is moved to its closed position.

4. An appliance door hinge assembly comprising:

a hinge plate including: (i) an inner portion adapted to be connected to an associated appliance structure; and, (ii) an outer portion adapted for pivoting connection of an associated door thereto;

a door mounting stud located at said outer portion of said hinge plate and configured for pivotally connecting the associated door to the hinge plate;

a base plate connected to the hinge plate by said stud to form an integrated assembly with said hinge plate, said base plate comprising an aperture through which said door mounting stud extends such that said base plate is pivotally connected to the outer portion of the hinge plate by said door mounting stud, wherein said base plate is adapted to be connected to the associated door for pivoting movement with the associated door relative to the hinge plate about said door mounting stud;

a damper system comprising a damper connected to the hinge plate;

a damper engagement structure connected to the base plate;

wherein said damper engagement structure is separated from the damper system when the associated door is in an opened position, said damper engagement structure contacts said damper system when the associated door is pivoted to an engagement position located between said opened position and a closed position, and said damper engagement structure contacts and activates the damper system when the associated door is pivoted toward the closed position from the engagement position whereby said damper slows movement of the associated door toward the closed position when the damper is activated;

wherein said damper system further comprises a base including a damper support bore, and wherein said damper comprises a cylinder body slidably located in the damper support bore of the base, said damper further comprising a piston slidably supported in a cylinder bore defined in said cylinder body and a piston rod connected to said piston and extending outwardly from a first end of the cylinder body, said piston adapted for movement in said cylinder bore between an extended position corresponding to an extended position of the damper and a retracted position corresponding to a retracted position of the damper;

and wherein an inner end of the damper support bore is closed by a coaxially located set screw threaded into the damper support bore, wherein an axial position of the set screw in the damper support bore is adjustable to correspondingly adjust an axial location of said damper in the damper support bore.

5. An appliance door hinge assembly comprising:

a hinge plate including: (i) an inner portion adapted to be connected to an associated appliance structure; and, (ii) an outer portion adapted for pivoting connection of an associated door thereto;

a damper system comprising a damper connected to one of: (i) the hinge plate; (ii) the associated door;

a damper engagement structure connected to the other of: (i) the hinge plate; (ii) the associated door;

said damper system comprising: (i) a base comprising a molded polymeric body including a damper support bore; and (ii) a damper comprising a cylinder body slidably located in the damper support bore of the base, said damper further comprising a piston slidably supported in a cylinder bore defined in said cylinder body and a piston rod connected to said piston and extending outwardly from a first end of the cylinder body, said piston adapted for movement in said cylinder bore between an extended position corresponding to an extended position of the damper and a retracted position corresponding to a retracted position of the damper;

wherein said damper engagement structure is separated from the damper system when the associated door is in an opened position, said damper engagement structure contacts said damper system when the associated door is pivoted to an engagement position located between said opened position and a closed position, and said damper engagement structure contacts and activates the damper system and causes sliding movement of the cylinder body relative to the base in the damper support bore such that said damper is moved from its extended position to its retracted position when the associated door is pivoted toward the closed position from the engagement position such that said damper slows movement of the associated door toward the closed position when the damper is activated;

wherein the damper system further comprises a damper activation lever movably connected to the damper base and movable relative to the damper base from a first position toward a second position in response to pivoting movement of the associated door toward its closed position, wherein said damper activation lever activates the damper by movement of the damper from its extended position to its retracted position upon movement of the damper activation lever from its first position toward its second position.

6. The door hinge assembly as set forth in claim 5, wherein the damper base is connected to the hinge plate.

7. The door hinge assembly as set forth in claim 5, wherein the damper base is connected to the associated door and the damper engagement structure is connected to the hinge plate.

8. The door hinge assembly as set forth in claim 7, further comprising a damper system mounting plate pivotally connected to the hinge plate and adapted to be secured to the associated door, wherein the damper base is mounted to the damper system mounting plate such that the damper activation lever contacts the damper engagement structure of the hinge plate and is pivoted from its first position toward its second position when the associated door pivots toward its closed position.

9. The door hinge assembly as set forth in claim 8, wherein the damper is spring-biased toward its extended position and movable toward its retracted position when the damper is activated.

10. The door hinge assembly as set forth in claim 9, wherein an inner end of the damper support bore is closed by a coaxially located set screw threaded into the damper support bore, wherein an axial position of the set screw in the damper support bore is adjustable to correspondingly adjust an axial location of said damper in the damper support bore.

11. An appliance door hinge assembly comprising:

a hinge plate including: (i) an inner portion adapted to be connected to an associated appliance structure; and, (ii) an outer portion adapted for pivoting connection of an associated door thereto;

a damper system comprising a damper connected to one of: (i) the hinge plate; (ii) the associated door;

a damper engagement structure connected to the other of: (i) the hinge plate; (ii) the associated door;

wherein said damper engagement structure is separated from the damper system when the associated door is in an opened position, said damper engagement structure contacts said damper system when the associated door is pivoted to an engagement position located between said opened position and a closed position, and said damper engagement structure contacts and activates the damper system when the associated door is pivoted toward the closed position from the engagement position such that said damper slows movement of the associated door toward the closed position when the damper is activated;

wherein the damper system further comprises a damper activation lever that pivots from a first position toward a second position in response to pivoting movement of the associated door toward its closed position, wherein said damper activation lever contacts and activates the damper upon movement of the damper activation lever from its first position toward its second position.

* * * * *